United States Patent [19]
Redmond

[11] Patent Number: 5,513,130
[45] Date of Patent: Apr. 30, 1996

[54] METHODS AND APPARATUS FOR GENERATING AND PROCESSING SYNTHETIC AND ABSOLUTE REAL TIME ENVIRONMENTS

[75] Inventor: Scott D. Redmond, San Francisco, Calif.

[73] Assignee: Redmond Productions, Inc., San Francisco, Calif.

[21] Appl. No.: 138,658

[22] Filed: Oct. 18, 1993

Related U.S. Application Data

[63] Continuation-in-part of Ser. No. 483,547, Feb. 22, 1990, Pat. No. 5,255,211.

[51] Int. Cl.$^6$ .................................................. G06F 17/00
[52] U.S. Cl. ........................................................ 364/578
[58] Field of Search ................................. 364/578, 400, 364/401, 419; 434/38, 43, 44, 45, 55, 61, 69; 395/154

[56] References Cited

PUBLICATIONS

Bryson et al.; "The Virtual Windtunnel: An Environment for the Exploration of Three–Dimensional Unsteady Flows" IEEE 1991.

Chung et al.; "Exploring Virtual Worlds with Head Mounted Displays"; SPIE 1989.

Huber "Current Research in the Use of Head Mounted TV Cameras to Study Depth Perception on Flat Screens" IEEE 1992.

McCarty et al.; "A Virtual Cockpit for a Distributed Interactive Simulation", IEEE 1994.

Bryson; "Virtual Spacetime; An Environment for the Visualization of Curved Spacetimes via Geodesic Flows" IEEE 1992.

*Primary Examiner*—Ellis B. Ramirez

[57] ABSTRACT

A system for generating and processing synthetic and absolute real time remote environments for interaction with a user and her biological senses is comprised of seven modules. These modules store, retrieve and process data to generate an output which interfaces with the system user's biological senses. These modules also track user data to accurately place the user in the generated and processed model. Various embodiments of the system user sensory interface are provided including visual and aural input devices and a three dimensional chamber having interactive tactile output via matrix-addressed, electromechanically operated rods driving a flexible skin.

1 Claim, 16 Drawing Sheets

GENERAL LAYOUT, NOMINAL 10' X 10' VERITY CHAMBER

CAMERA / MODEL

USER LCD OR HI-RES. MONITOR FANNY PACK SYS.

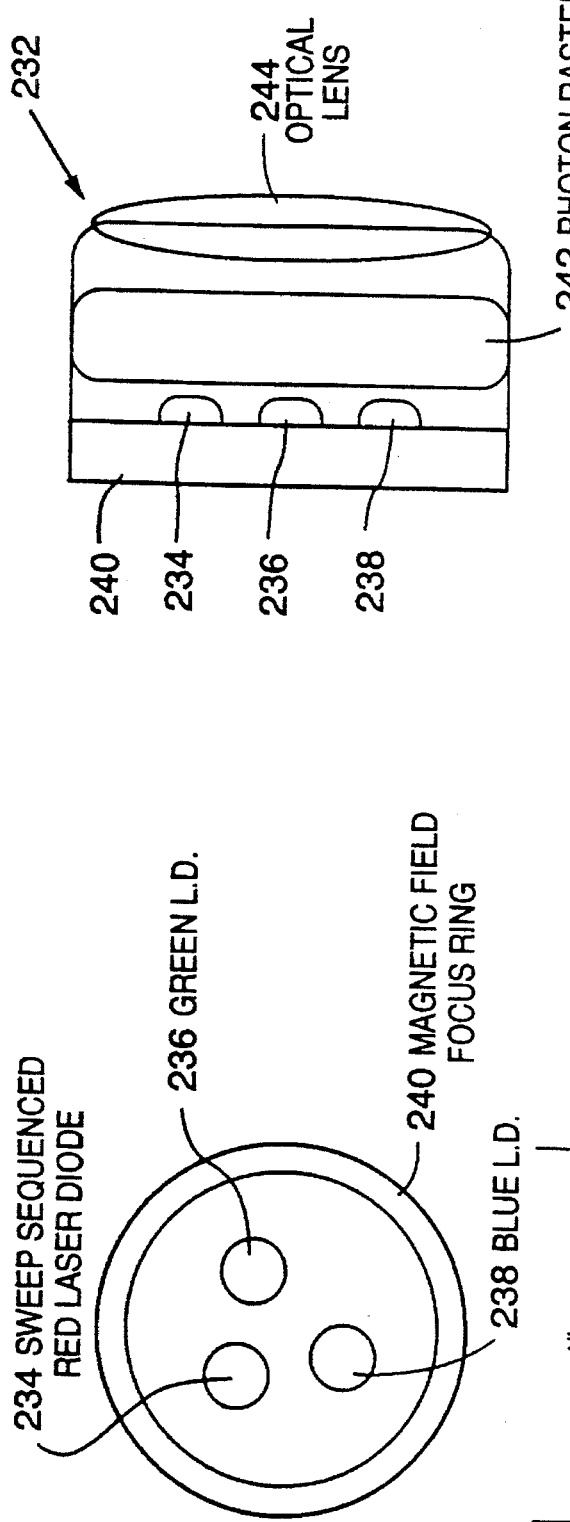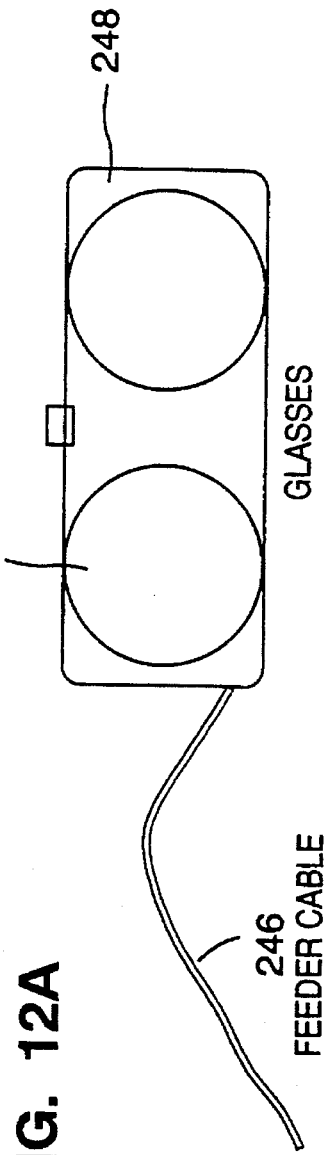
FIG. 12A DIODE INER EYE-SCAN SYSTEM -BASIC MODEL
FIG. 12B
FIG. 12C

REMOTE SINGLE HI-RES MONITOR VISION DEVICE

MICRO-SCREEN OPTION

PIXEL ADDR'G

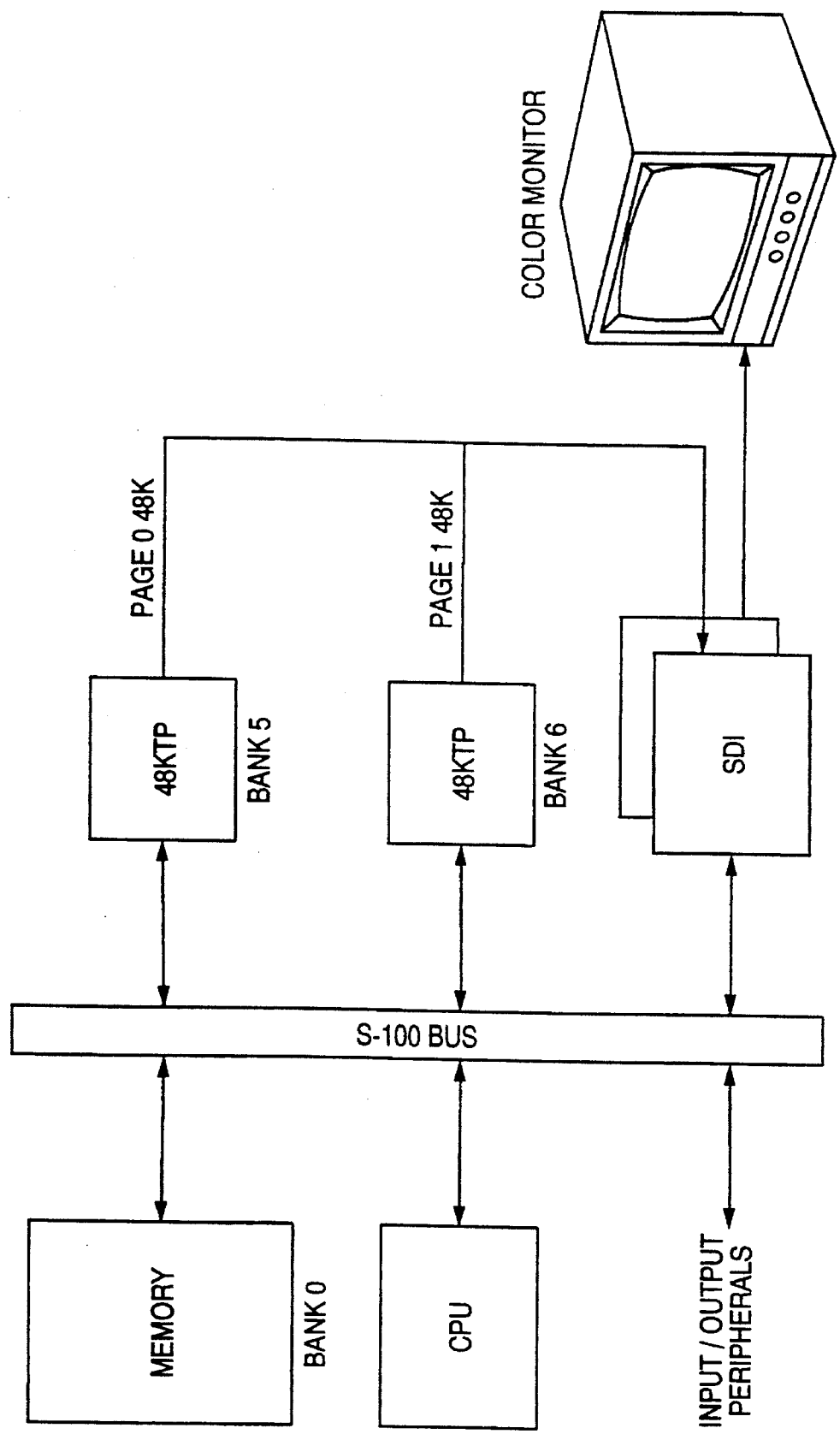
FIG. 17 AN SDI SYSTEM WITH 48KTP BOARDS

METHODS AND APPARATUS FOR GENERATING AND PROCESSING SYNTHETIC AND ABSOLUTE REAL TIME ENVIRONMENTS

RELATED APPLICATIONS

This application is a continuation-in-part of application Ser. No. 483,547, filed Feb. 22, 1990, now U.S. Pat. No. 5,255,211.

TECHNICAL FIELD

The present invention deals generally with computer-generated and processed environments, and more specifically to systems for generating and processing synthetic and absolute environments for three dimensional visual images, multidimensional aural images and tactile input to the system user's biological senses.

BACKGROUND OF THE INVENTION

Recent advances in hardware and software have permitted an increased awareness and development effort in the area of interactive "synthesized" environments. The goal of these development efforts is to provide a synthesized environment which is so realistic as to be virtually indistinguishable from the "absolute" or actual reality. The applications of these interactive synthesized realities are diverse: flight simulation, preconstruction architectural review and walkthrough, videogame-like entertainment, molecular modeling and engineering, microsurgery, communications and educational applications.

The NASA Ames Research Center has been working in synthetic environment development for many years. NASA's Virtual Interface Environment Workstation (VIEW) uses a head-mounted black and white LCD display for communicating generated three dimensional images to the system user.

Another system developer is VPL Research. VPL Research has designed a DataGlove which employs fiberoptics to monitor flexion and extension of the user's fingers, and a Polhemus magnetic tracking device to position the user's hand in a three dimensional matrix. VPL Research provides a DataSuit which expands the technology used in the DamGlove to monitor movement of the entire human body. VPL Research's EyePhone, or visual input device, consists of two color LCD monitors viewed through an optics system. In VPL Research's system, each monitor is driven by a separate computing path. A high resolution dot pattern is then superimposed over the transmitted image to improve perceived resolution. VPL Research provides a DataSuit which expands the technology used in the DataGlove to monitor movement of the entire human body.

AutoDesk has recently announced its development efforts in computer-generated synthetic reality systems. AutoDesk is primarily interested in architectural walkthrough applications of computer-generated synthetic environments, as a natural companion to AutoDesk's well established position in the CAD industry.

TiNi Alloy Co. has announced a tactile array of tiny, electronically activated pins to simulate the sensation of touching shapes and forms.

These existing systems fail to provide a totally integrated sensory output, to capture photo realistic images, sound and tactile sensory stimuli in a single interactive time and space. The processing technology in these earlier systems permits only gross "computational" image representations, images which are not realistic because of computation-limited low polygon density. The system architectures are inherently inefficient, preventing the provided system storage and processing capacity from operating at the computational speed required to provide super-realistic visual, sound and tactile imagery in an interactive mode.

The present invention provides a fully integrated system with massive parallel processing capabilities for generating and processing super realistic visual images, multidimensional sound images and tactile output. The present system permits the incorporation of pre-existing (actual) realities, defined herein as "absolute" reality, in combination with the computer-generated "synthetic" environments. The present invention is able to accomplish these features by providing a system architecture which optimizes computer memory storage and retrieval and which enables the required computations with a minimum of compute server capacity.

It is an object of this invention to provide a unique combination of system architecture, computer-generated environmental output signals and computer output-human sensory input interfaces which provides the system user with a super realistic experience when interacting with the system.

It is an object of this invention to generate synthetic and absolute environmental model output of super realistic visual images, multidimensional sound images and interactive tactile output.

It is another object of this invention to provide data storage and retrieval architecture which employs image and data buffers to permit rapid access to stored data and unlimited capacity for increasing the speed of data retrieval and the data base volume.

It is an object of this invention to provide system architecture which permits efficient use of data memory and retrieval means by rapid reconfiguration of stored and currently viewed images.

It is an object of this invention to provide a system which can effectively combine "absolute" realities with "synthetic" realities to provide remote system operation capabilities, including remote robotics.

It is an object of this invention to monitor user position, movement and health telemetry data without intrusive sensors and cumbersome umbilical cords.

It is an object of this invention to provide generated and processed environment modeling module output to the user's biological sensory interfaces through massive micro compute server parallel data processing techiques.

It is an object of this invention to employ an environment modeling module in which three dimensional visual output is optically differentiated to obtain stereographic images using a single output mode.

It is an object of this invention to provide an environment modeling module which incorporates as pre-selected parameters the natural and known laws of physics in the generation of synthetic and absolute environments.

These and further objects of the present invention will be apparent to those of ordinary skill in the art with reference to the following description and figures.

SUMMARY OF THE INVENTION

A system for generating and processing synthetic and absolute real time environments comprises six separate, interconnected modules. The data storage and retrieval module is designed for storing high resolution digital image, sound and user position coordinate data. The retrieval side of this module is designed to instantaneously retrieve the stored data. The data storage and retrieval module includes image files of natural objects; digital sound files of natural sounds; image compression software which permits efficient data storage and retrieval; primitive image basic model files such as polygons, fractals, ray tracing and subprimitive existing elements; image pre-design data processing array for the storage and retrieval of already generated synthetic image data; and, interactive throughput image and sound processing which generates and processes images corresponding to the user's body parts in the user's field of viewing the generated synthetic or absolute environment.

The second system module is an umbilical-less sensor which senses and transmits user position and movement data obtained by co-matrixed averaging of at least two separate sensor modes. This sensor module detects and transmits user health telemetry data to the environmental modeling module, data storage and retrieval module, and the primal control module.

The third module is an environmental modeling module for the real time generation and processing of synthetic and absolute environment output which uses pre-selected commands and parameters to render synthetic images, sounds, forces and movements with realistic accuracy, including user-viewed interactive user body parts, through massive micro compute server parallel data processing techniques.

The fourth system module is the user stimuli module, referring to the output/input interface between the environmental modeling means output and the user's biological sensory input. This module includes apparatus for three dimensional visual input to the user's eyes, apparatus for multi-dimensional sound input to the user's ears and apparatus for tactile input to the user's hands, feet and other body parts.

The fifth module is the primary control module for overall system operation, including the interface between the data storage and retrieval module, sensor module, environmental modeling module and user stimuli module. The primary control means is configured to control remote robotics.

The final system module, in-system communications means, permits user vocal communication to and from the primary control module.

Prior to the user interactive session, the system user selects a synthetic or absolute reality environment which is then communicated to the primary control module. This user selection presets some of the computational parameters required to generate the synthetic and absolute realities, and creates a data library subset which can be more easily accessed and processed. Thereafter, the synthetic and absolute environment is computed and generated, allowing the system user to interact with the generated environment through the in-system communications means, sensor module and user stimuli module.

There are several embodiments of the three dimensional visual input device which is part of the user stimuli module. In the first embodiment, visual images are input to the user's eyes via biosynchronized peripheral microstrobes in combination with dual vision LCD color eye monitors disposed on a headset. A second embodiment of the visual input device employs fiberoptic stacked array dual color images from two high definition color monitors. In a third embodiment, direct retina scan and other internal eye image placement is achieved by low power laser diode imaging packs and magnetic light aiming field. A fourth embodiment of the visual input device uses projection of the image onto rear micro-screens mounted one-quarter of an inch in front of surface of the user's eyes from fiberoptically routed high definition color monitors. In a fifth embodiment, frame sequenced dense-pack fiberoptic image decompression onto rear micro-screens mounted one-quarter of an inch in front of surface of the eyes is obtained by belt mounted HDTVs.

The user stimuli module, in a preferred embodiment, includes components for enhanced tactile input. A three dimensional chamber is adapted to simulate gross environmental conditions such as smells, sonic rumbling, variable temperature and variable wind velocity. The chamber is equipped with a rectangular matrix of rods, which can be arranged with their longitudinal axis perpendicular to the chamber wall, or in a stand alone unit inside the chamber. The rods are electromechanically manipulated to generate shapes and textures for interaction with the system user. In another embodiment, the user is provided with boot shaving bladders which can be inflated and deflated to change the user's perception of the chamber surface. In the preferred embodiment, the chamber is equipped with a variable resistance treadmill.

BRIEF DESCRIPTION OF THE DRAWINGS

FIG. 5, 5A–5B show the block diagram of the architecture of the graphics subsystem of the high performance workstation, labeled PRIOR ART.

FIG. 12a is a plan elevation; FIG. 12b is a side elevation, and FIG. 12c is a schematic view of the third embodiment of the visual input device.

FIG. 17 is a block diagram for a two port pixel addressing scheme.

DETAILED DESCRIPTION OF THE INVENTION

Figure 1:
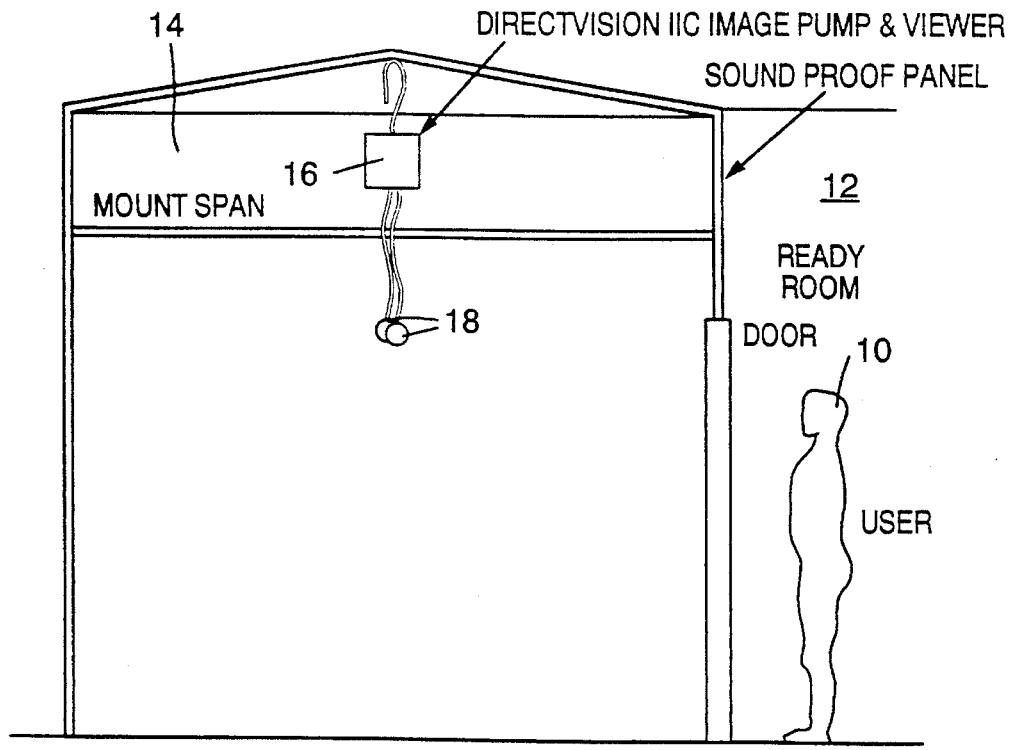
FIG. 1 is an elevation view of one embodiment of the user stimuli module of the present invention.

The present invention has applications in resource conservation, e.g., solicitation by non-profit organizations and foundations, research groups, scientific community or university related institutions for funding and advance support from potential contributors. For example, demonstrations involving ozone depletion, the effects of rainforest depletion on water and air quality control, reforestation concerns, etc. could be generated for fundraising purposes. Additionally, endangered species and wildlife programs could be developed. The technology could be applied for evaluation studies of animal migration and habit patterns without the danger associated with actual field studies.

The system may be applied to study industrial systems for the design of recycling, waste disposal management and hazardous waste handling apparatus.

Synthesized environments may be applied in the procedure of adoption, permitting potential parents and children to preview the situation.

The system has unlimited direct medical applications, e.g., in the training of surgeons, nurses and other staff, in rehabilitation programs for the disabled, handicapped and substance addicted patients.

Unlimited educational applications in geography, mathematics, physics, health education and many other subject areas are possible.

There are law enforcement applications of this system in solving crimes by reenactment of events, securing witnesses and protecting their identities. The system can be used in the training mode as well.

Artistic applications of the three dimensional synthesized models to two dimensional surfaces is contemplated.

Each of these diverse applications of the system is facilitated by the creation of a set of data specific to the desired application at a time prior to the actual user interactive session. In other words, before the user actually interacts with the synthesized and processed lo environment, there is a selection by the user of the environment in which the interaction is to take place. So, e.g., if the user wanted to create and interact with a "nature" environment such as a beach, the user would select that environment, and the system technicians would then generate a series of data files which would contain the information necessary to generate and process the images, sounds, smells and tactile stimulations which correspond to the chosen beach environment. This initial pre-interactive data development session cuts down on the number of computations which must be made at the time of the actual user interactive session, by presegregation of the data o required for a particular application from the larger system database.

The present invention is able to provide a fully integrated synthetic output by a programming technique known as cascade programming. According to this technique, each of the sensory outputs (sound, smell, touch) is tied to the visual image data associated with that sound, smell and touch so that a number of visual images can be tied together to create a scene, while simultaneously all of the associated sensory perceptions associated with those visual images are easily integrated into the total scene.

The present invention comprises six basic modules: data storage and retrieval module, user sensor module, environmental modeling module, user stimuli module, primary control module and in-system communications module. There are many different system models which practice the present invention through these six modules, beginning with the low end model which is essentially configured like a personal computer workstation, through the upper end auditorium-sized, synthesized environment outputs. All of these models contain the six modules, but each model has different capacity depending upon the output demands of the application. The claims appended hereto are intended to generically cover the system having six modules, without regard to the particular model into which these modules are incorporated.

In describing these six functionally-defined modules, it is sometimes the case that the functional modules are not actually discrete hardware units. For example, the data storage and retrieval module, the environmental modeling module and the primary control module share common hardware.

Figure 2:
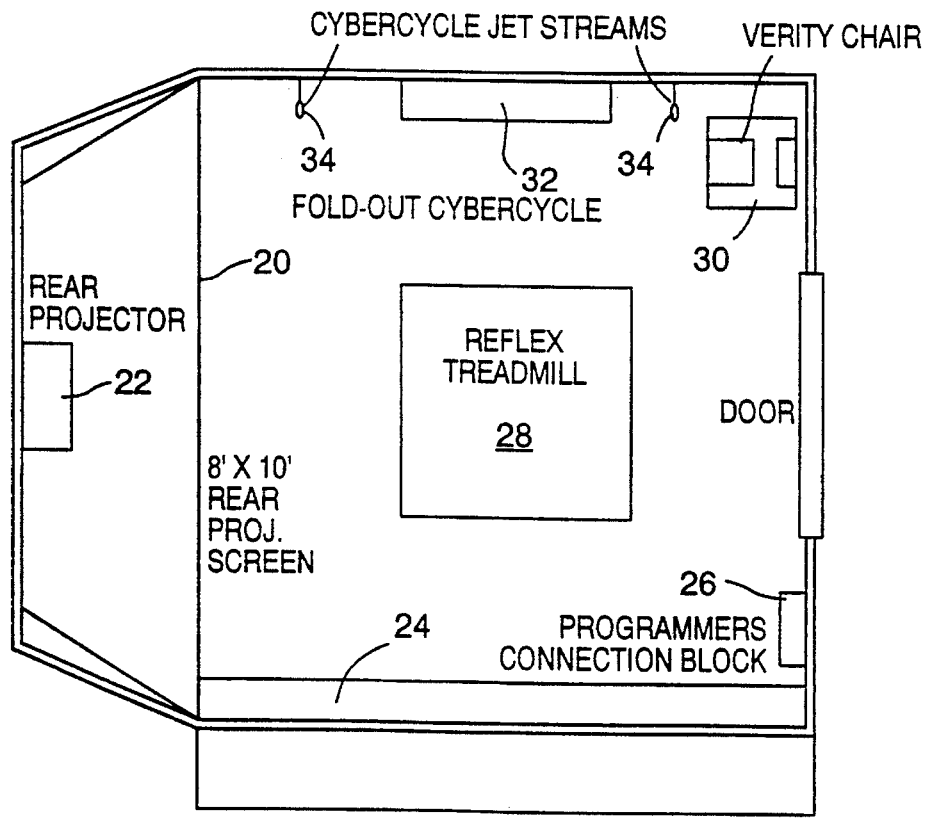
FIG. 2 is a plan view of an embodiment of the user stimuli module of the present invention containing additional stimuli apparatus.

FIG. 1 shows an elevation view of one embodiment of the user stimuli module, and FIG. 2 shows a plan view of a three dimensional chamber in which user stimuli components have been deployed. The purpose of these figures is to show the breadth of anticipated user stimuli modes which are generated by the instant invention.

Referring to FIG. 1, the user 10 prepares for the interactive session with the system in a ready room 12. Depending upon the model or embodiment, the user 10 may be required to don application-specific apparel, including suit, gloves and boots, which transmits user position and movement data to the system, and monitors user health telemetry data The user's sensory interaction with the system actually occurs in a chamber 14. This chamber is steel framed and modular, coming in cubic sections of six feet square. The size of the chamber 14 is dictated by the anticipated applications. The walls, ceiling and floor of the chamber 14 are easily adapted to fit a variety of situations. As seen in FIG. 2, the chamber 14 is adequately flexible to permit the installation of various sensory interface devices. The chamber 14 is designed to accept and operate coherent and incoherent biologically safe electromagnetic spectrum radiation devices to determine user position and movement within the three dimensional matrix defined by the chamber.

A high definition color television monitor 16 sometimes referred to as an image pump is suspended from the ceiling of the chamber 14. Headpiece 18 is fiberoptically linked to the monitor 16 to permit the user to receive three dimensional visual and multidimensional aural input from the system. Specific embodiments of the visual input device 18 are more fully described below in a section entitled USER STIMULI MODULE.

Additional stimuli apparatus are seen in FIG. 2. These apparatus are deployed in chamber 14. Rear projection screen 20, and accompanying projector 22, are used either in place of, or in combination with the visual input device 18 shown in FIG. 1 to provide visual input. The chamber 14 is equipped with a device 24 for system output to the user's tactile senses. In this embodiment of the tactile input device, the wall is comprised of a matrix of rods which are electromechanically driven by the system environmental modeling module. The rods are covered with flexible skins to provide continuous surface shape and texture input to the user's biological senses. This tactile mode is carefully controlled by the system, and is set to correspond with the visual and aural imagery which the user is simultaneously experiencing.

A programmer connection block 26 is provided for optional umbilical connections to the primary control module and other system components.

A variable resistance treadmill 28 is positioned in the floor of chamber 14, linked to the system output. Thus treadmill 28 can be used to provide user 10 with a sensation of actually walking through the synthesized and processed environment.

In the corner of chamber 14 is a chair 30 which is adapted to receive the user 10. A user would employ this chair as a stand alone demonstration unit or for tired or in firm system users.

On the chamber wall opposite to the tactile output device 24 is vehicle simulator 32 which is designed to provide the user with the sensation of riding or driving a vehicle through the synthesized environment. The vehicle simulator 32 is adapted to safely pitch and yaw to further enhance the feelings associated with the synthesized environment. Jet air streams 34 are provided in the chamber wall, and controlled by the system to enhance the feeling of movement through the synthesized environment.

With this overview of the levels of environmental modeling which are processed by this system, we can now proceed to describe the individual modules which comprise this system.

I. DATA STORAGE AND RETRIEVAL MODULE

The architectural design of the data storage and retrieval module accommodates large volumes of different types of data while simultaneously providing rapid access to this stored information. The system architecture enables infinite parallel computing and speed step-up capability through the addition of compute servers. Without these capabilities, it is not possible to generate and to continually process a super realistic, synthesized output, as is required in the present invention.

The data storage capacity of this module is obtained by using existing high performance workstations with local mass storage working off of servers. Write once read many (WORM) optical disks and removable CD ROMs offer tremendous storage capability in addition to the local mass storage.

According to a preferred embodiment of the present invention, Silicon Graphics' POWER Series provides 160 MIPS and 28 MFLOPS of sustained performance, up to 1 million Z-buffered 4-sided, Gouraud shaded, Phong lighted, independent polygons per second per unit, and a frame buffer access rate of 8 Million pixels/second.

A. CPU SUBSYSTEM HARDWARE

The fundamental design of Silicon Graphics' POWER Series workstation is a tightly coupled symmetric shared memory multiprocessing architecture. The CPU's in Silicon Graphics' 4D/210, 4D/220, 4D/240, and 4D/280 systems are the MIPS designed RISC processor, the R3000, coupled with a companion R3010 floating point chip. The CPUs in the 4D/120GTX and 4D/120S are the R2000 and its companion R2010 floating point co-processor.

Figure 3:
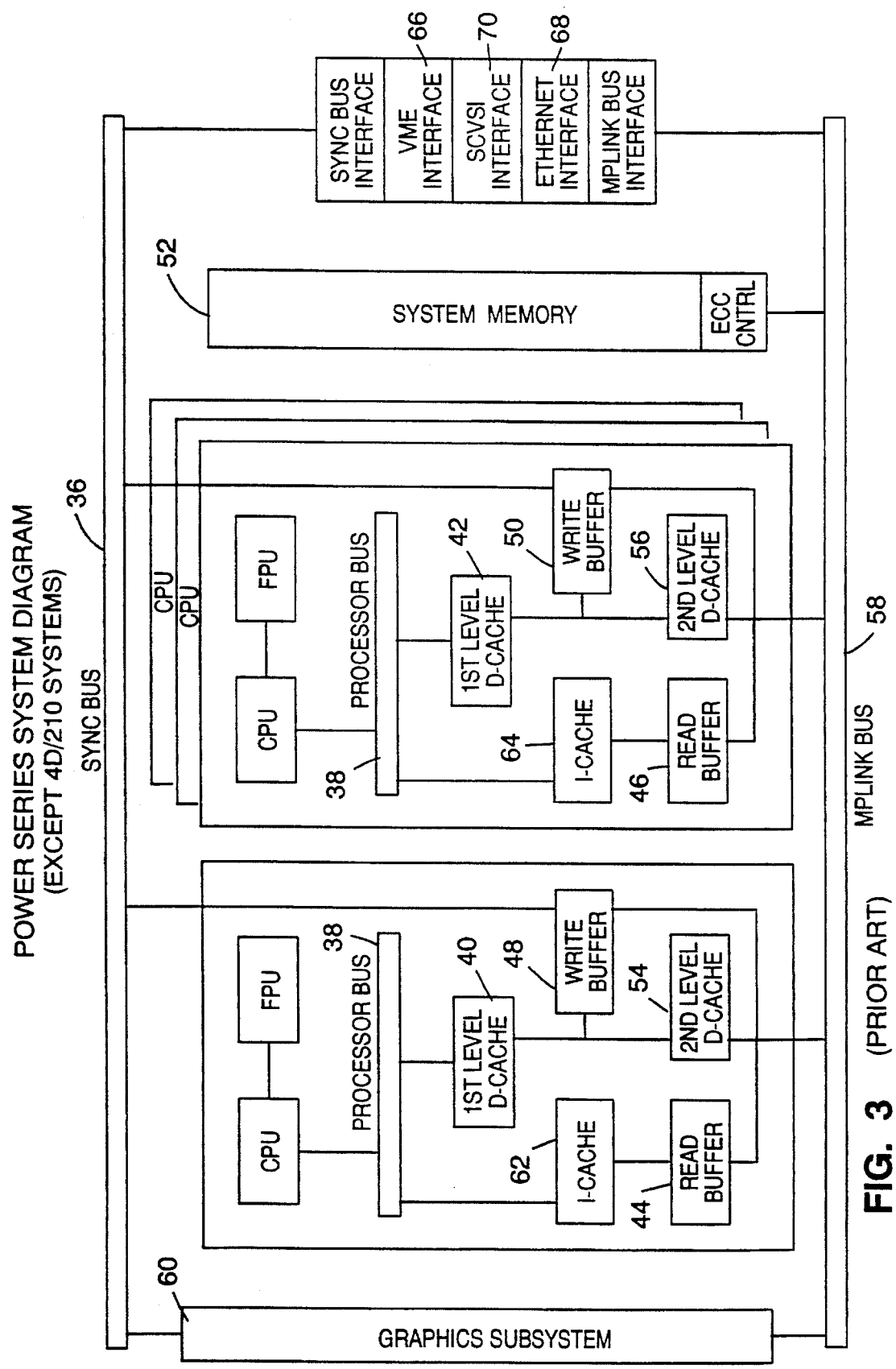
FIG. 3 is a block diagram of the major components of the high performance workstation used in the present invention, labeled PRIOR ART.

FIG. 3 is a block diagram of the major components of the system. Several of the important buses of the system are shown in this diagram. The .Sync Bus 36 provides high speed synchronization between the main processors of the system in support of fine grain parallelism. The processor bus 38 allows full speed access (zero wait state) to instructions and data from the individual first level caches of the main processors 40 and 42. The read buffers 44 and 46 and write buffers 48 and 50 allow for the efficient flow of information between the processors and the main memory 52 of the system. The second level data cache, 54 and 56 provides the additional bandwidth needed with such high speed processors to support an automatically consistent shared memory computing model. The MPlink Bus 58 supports protocols for consistent data sharing and high speed block data transfers among the processors, main memory, the I/O system, and the graphics subsystem 60.

1. Processor Bus

Each processor provides both an address and a data bus (known as the Processor Bus) that can support sustained data transfers at 8 bytes every clock cycle. Thus an eight processor system has a total processor-to-cache bandwidth of 1600 megabytes per second.

The first level caches 40 and 42, separate instruction and data, are each 64 kilobytes. The instruction caches 62 and 64 are fed by a custom read-buffer that allows extremely fast access to sequential instructions. The data cache drives out through a custom write-buffer that buffers off the MPlink Bus.

These buffers also provide a convenient point for an asynchronous interface between the processors and the MPlink Bus 58. The R3000 processors run at 25 Mhz, asynchronous from the MPlink Bus. Thus the speed of the CPUs in the system can be increased over time without changing the bus or memory timings. This architecture ensures upgrade capability without replacing a large portion of the system.

Each second level cache is 256 kilobytes in size, organized as 16 lines of 16 bytes each. (Second level caches in Silicon Graphics' 4D/120GTX and 4D/120S are 64 kilobytes. The 4D/210S and the 4D/210 GTX do not require a second level cache.) This cache provides block transfer capability for the MPlink Bus and provides the additional bandwidth necessary to keep all individual caches in a consistent state.

The second level data cache 54 and 56 watches every transaction on the MPlink Bus 58 and check for transactions involving data in its data storage. This checking is performed by matching every address on the; MPlink Bus 58 with addresses in the tag storage sections of second level data cache 54 and 56. The first level data caches 40 and 42 are always a subset of the second level data caches 54 and 56 so data consistency is guaranteed.

In addition, since all the caches are physical address caches rather than virtual address caches, there are no aliasing problems caused by mapping different virtual addresses to the same physical address. The difficult system level issues that arise when dealing with multiple virtual address caches are not present in this system.

2. The Sync Bus

The Sync Bus 36 is designed for the synchronization need of a multiprocessor supporting efficient fine-grained parallelism. It is implemented as a proprietary Silicon Graphics VLSI part. The goal is for a single application to be able to make efficient use of parallel processors ever,, at the individual loop level, in addition to the kinds of larger-grained parallelism found in many system simulation applications and the even larger-grained parallelism found in the process structure of UNIX™ system.

The Sync Bus 36 provides 65,000 individual test-and-set variables. These variables are in a special part of the physical address space. They are addressed as memory and can be allocated to individual applications by the operating system. They are arranged 64 to a page and can be mapped into the virtual address space of an application. The operating system itself makes use of them to provide very fine grained locks for the control variables of the operating system.

The operating system is thus a very parallel, fully symmetric multiprocessing operating system. In other words, the Silicon Graphics version of UNIX V.3 is a well developed parallel processing application on the POWER Series whose speed demonstrates the power of this approach to high speed computing.

The Sync Bus 36 provides for the distribution of interrupts from one processor to another, or from the I/O system to appropriate processors. The flexibility of the interrupt distribution system means that the operating system can provide scheduling algorithms that support the power of private caches rather than disrupt it.

3. The MPlink Bus

The MPlink Bus 58 is a pipelined, block transfer bus that supports the cache consistency protocol as well as providing 64 megabytes of sustained data bandwidth between the processors, memory, I/O system, and the graphics subsystem. Because the Sync Bus 36 provides for efficient synchronization between processors, the cache consistency protocol is designed to support efficient data sharing between processors. If a cache consistency protocol had to support synchronization as well as sharing, a compromise in the efficiency of the data sharing protocol would be necessary to improve the efficiency of the synchronization operations. With separate buses for each of these separate functions, each bus can be designed for optimal performance without compromise.

The cache consistency protocol used is sometimes called the Illinois protocol. Each second level data cache maintains the state values for each cache line. A line can be in one of four states: invalid, private read, shared read, or private write. If a processor writes into a shared read line, the processor must first invalidate other copies of that cache line before the write can be completed. Simultaneous writes into a shared read line by several processors will result in write misses in all the processors except the one which successfully acquired the MPlink Bus and issued an invalidate operation on it. In addition, any synchronization operation performed by a processor on the Sync Bus must not complete until all pending write activity by that processor is complete.

With these simple rules enforced by the hardware protocols of the Sync Bus and the MPlink Bus, efficient synchronization and data sharing are achieved with a simple shared memory model of parallel processing. The only data not visible to any processor are the data in another processor's registers. These sorts of invisible data are handled by the usual safeguards in modern optimizing compilers.

The physical structure of the MPlink Bus 58 is 32 address lines and 64 data lines. An MPlink Bus transaction is six cycles in length although the last two data transfer cycles can overlap with the first two cycles of the next transaction, resulting in a sustainable data transfer rate of 64 megabytes per second in a very economical configuration. New data arrives in the last two cycles. Old data from a swapped cache line is carried in the middle two cycles. Addresses are transferred in the first two cycles. Bus arbitration is pipelined and doesn't add to the cycle cost of transactions.

4. I/O Buses

Silicon Graphics' POWERpath™ architecture incorporates three separate I/O buses; VME 66, Ethernet 68, and SCSI (Small Computer System Interface) 70. These buses operate independently to maximize the I/O throughput of the total system. The VME bus 66 is supported via a proprietary SGI chip (DMAP) as a full functioning, full performance VME interface. VME support includes double and triple high Eurocard formats as bus masters and block mode transfer. The SCSI bus 70 provides a low cost, standard interface for disk and tape. The built-in Ethernet 68 provides access to TCP/IP and DECnet™ networks.

Silicon Graphics' IRIX™ kernel is designed to operate a symmetric shared memory multiprocessor efficiently and reliably. This is accomplished through a software architecture which allows each processor to independently execute kernel code. Independent execution allows full use of each processor by the process which is executing on it. Kernel data structures are protected via locks and semaphores, which allows data structures and I/O paths to be shared and used in parallel.

B. LOW LEVEL SYNCHRONIZATION

Low level synchronization is achieved through hardware-supported spinlocks. Each spinlock provides atomic access to a single-bit flag which indicates ownership of a resource. If the lock is held by one processor, other processors will busy-wait, looping on the lock until it is freed by an owning processor. This form of synchronization is very useful when the waiting time will be short, typically less than the time it would take to switch contents.

If a resource is to be locked for a longer period of time, a semaphore is used instead. The semaphore queues a process for access to a resource and, provides for the process to be unblocked when the owning process releases the resource.

C. DATA STRUCTURE ACCESS

All shared kernal data structures, such as inodes, buffers, or process table entries, are protected via some form of lock. This allows multiple processors to access the data structure in parallel without interference. This locking has been fine-tuned through-out the system. The use and format of shared data structures has been optimized to eliminate or minimize the amount of spinlocking required.

The key limiter of performance in a multiprocessor kernal is the contention that may occur for data structures. A fully configured IRIX™ kernal uses over 4000 spinlocks. Lock and semaphore metering are used to insure that these synchronization utilities are effectively utilized.

D. SELF-SCHEDULING PROCESSORS

The kernal maintains a single run queue for all processes. Each processor is self-scheduling. When a process blocks, that processor can immediately search the run queue for new work and dispatch it without interaction with other processors. Each processor is capable of o executing any process which might be runnable, providing fast response and automatic workload balancing.

E. I/O HANDLING

Figure 4:
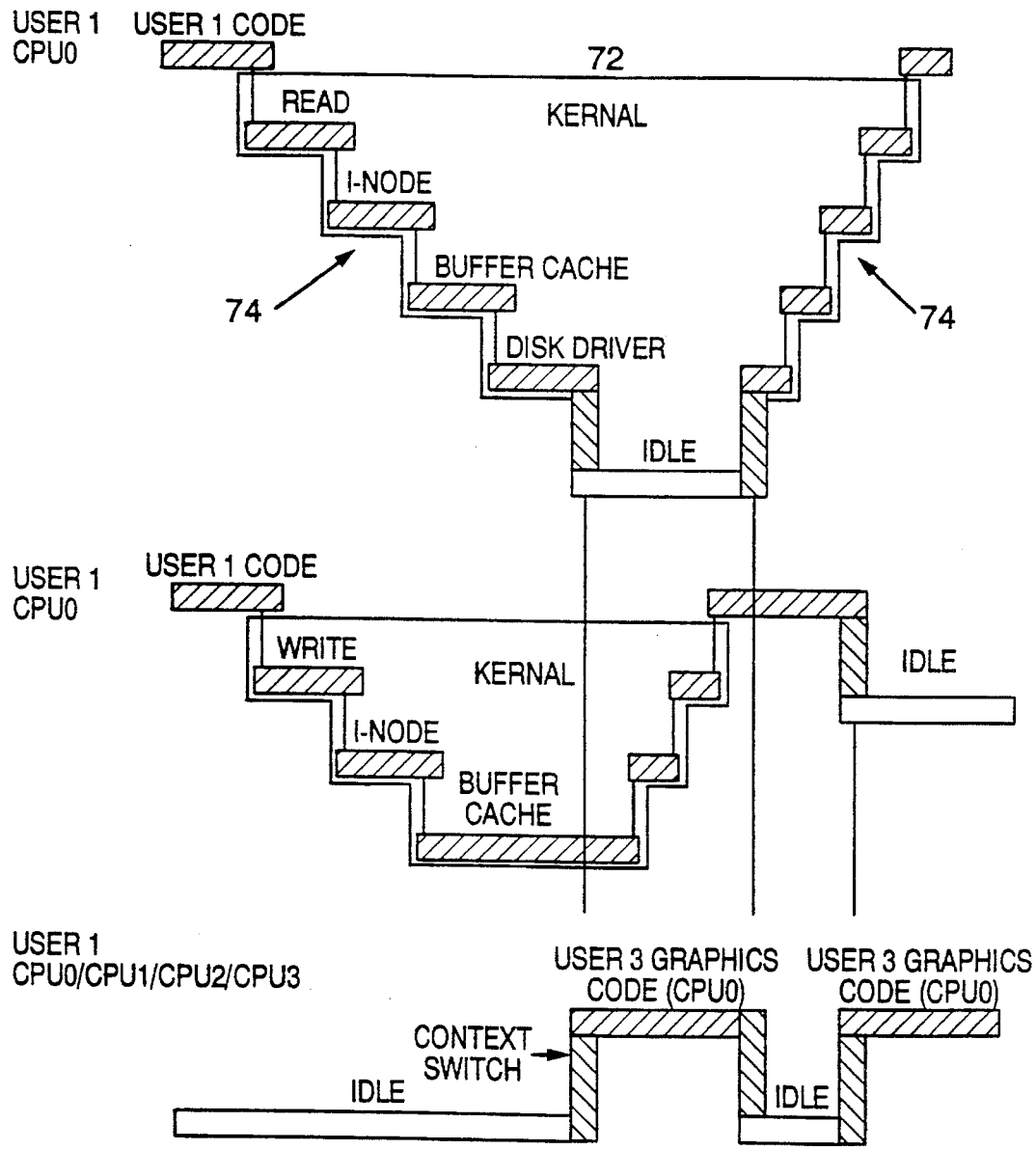
FIG. 4 is a block diagram of the input/output subsystem of the kernel of the high performance workstation, labeled PRIOR ART.

The I/O subsystem of the kernal 72 (shown in FIG. 4, labelled Prior Art) is constructed to allow each processor to independently access the drivers, such as the disk drivers, are fully parallelized, resulting in higher I/O throughput. A transparent driver locking scheme is incorporated to enhance portability of existing drivers.

F. REAL-TIME PERFORMANCE FEATURES

The trap and system call handling paths 74 in the kernal have been highly optimized. Exception condition handling is optimized for the no-exception case, unlike most other UNIX based systems. Self-scheduling processors provide an additional level of response, since a processor can be dispatched to handle an event more quickly.

The system run queue has been reorganized as a sorted list of processes based on process priority. This provides O(1) algorithmic performance for dispatching processes, which is extremely important in a self-scheduling system where multiple processors may be accessing the run queue simultaneously. Normal UNIX™ scheduling is O(n), where n is the number of runnable processes.

G. PARALLEL PROGRAMMING SUPPORT

The kernal supports parallel programming by providing a low-level resource shared model. Parallel programming is aided by getting the operating system out of the way and allowing processes to synchronize independently of the kernal. System calls are expensive in any system, and should be avoided if the programmer desires the best performance possible from his application.

The IRIX™ kernal introduces a new programming paradigm similar to threads or lightweight processes, with little of the additional programming burden caused by these schemes. This paradigm, called process share groups ("Beyond Threads: Resource Sharing in UNIX," Winter 1987 USENIX Conference), allows a process to share many of its resources, :such as the virtual memory address space, file descriptors, user and group IDs, working and root directory and others. Within the kernal, visual address sharing is accomplished by sharing the kernal memory management structures between the processes, and providing simple locking for those structures.

Since other resources may be shared as well, it is possible to construct many sophisticated applications, such as network servers or asynchronous I/O handlers, with a minimum of effort.

H. TRANSLATION LOOKASIDE BUFFER SYNCHRONIZATION

The translation lookaside buffer (TLB) is a cache of virtual to physical address translations that is used by the processor to speed virtual memory handling. This cache is managed entirely by software. Hard synchronization is costly in terms of both dollars and performance. IRIX™ manages all TLBs in all the processors as a distributed resource. ("Translation Lookaside Buffer Management in a Multiprocessor System," Winter 1987 USENIX Conference Proceedings). TLB flushing is minimized through a sophisticated algorithm. The usual, low performance solution of TLB flushing on context switch is totally avoided.

I. GRAPHICS SUBSYSTEM SUPPORT

Support of Silicon Graphics' GTX graphics subsystem is integrated into the IRIX multiprocessor kernal. The graphics subsystem can be driven from any processor on demand. Access to the graphics pipe is achieved through direct mapping of the pipe to the use's address ,space. Management of graphics context switching is handled fully by the kernal.

The graphics subsystem is capable of direct DMA to the frame buffer. This is supported in the kernal through direct mapping of the user's buffer for DMA operations, which avoids all data copying.

J. GRAPHICS HARDWARE ARCHITECTURE

Figure 5A:
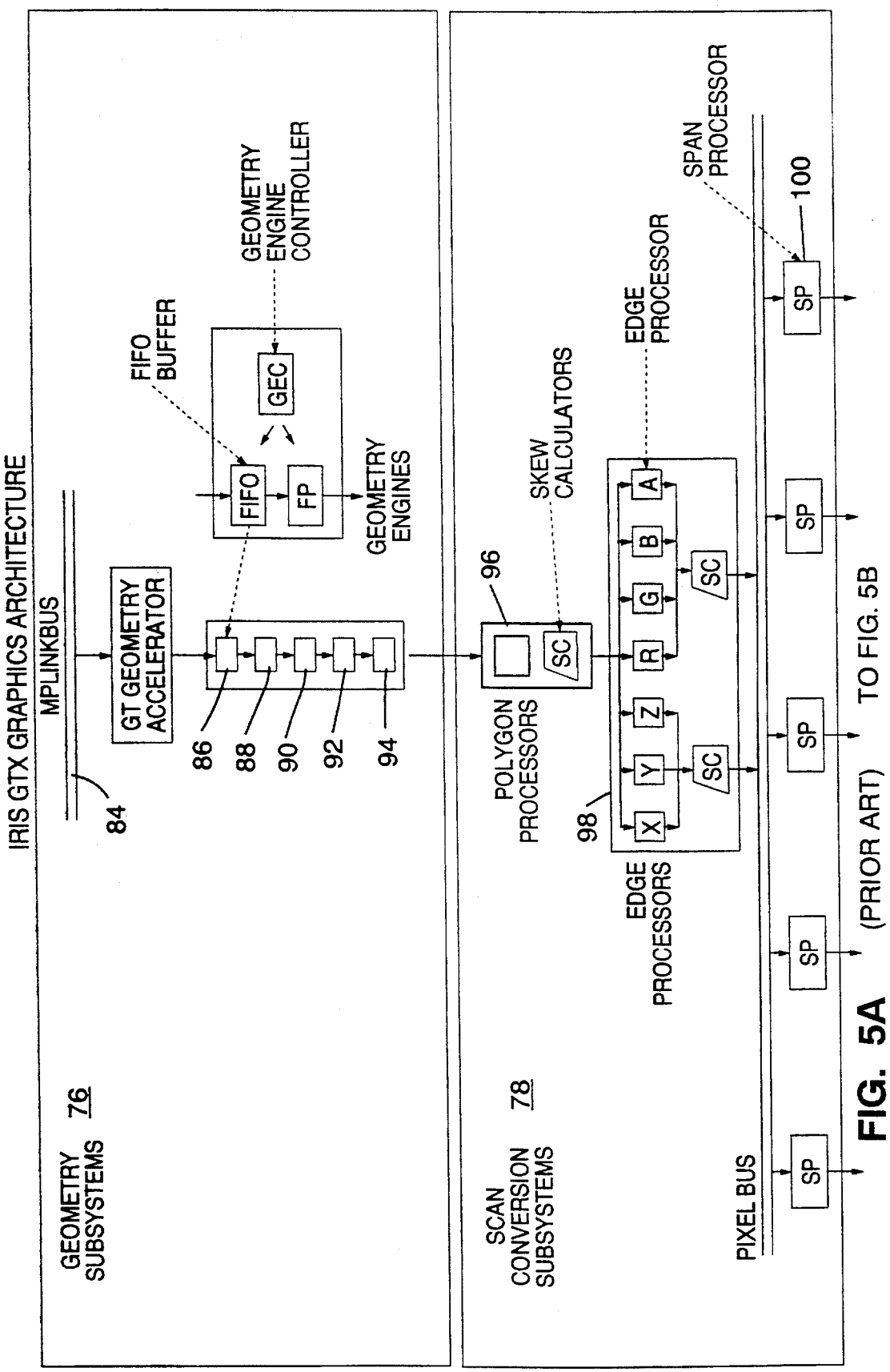
Figure 5B:
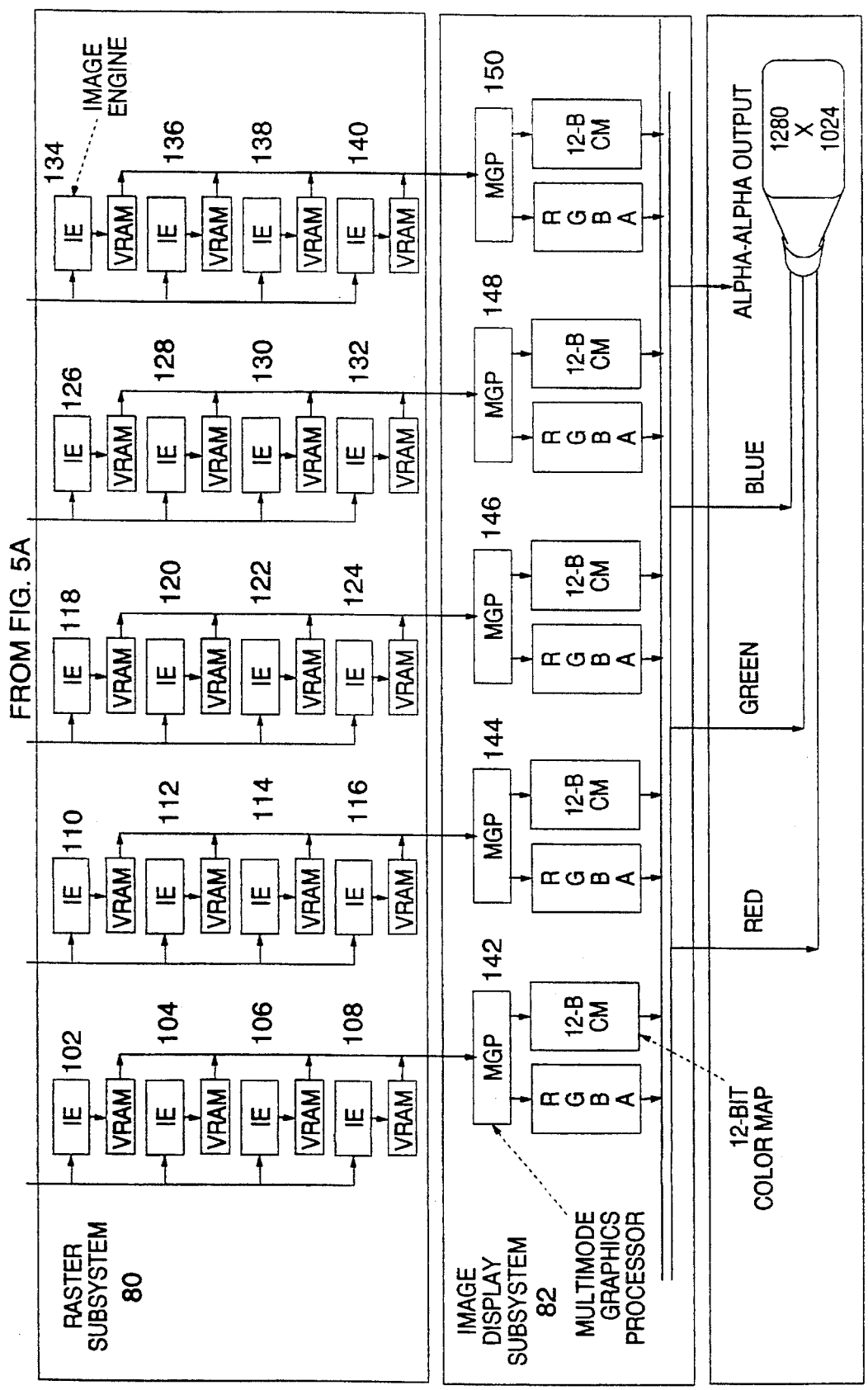

Through its use of parallel processing technology and 50 proprietary graphics processors, Silicon Graphics' GTX architecture (shown in FIG. 5, labelled Prior Art) allows users to interact with complex 3-dimensional images in real-time, under direct input device control.

Graphics data are processed by four pipelined graphics subsystems before being displayed on the screen:

- Geometry Subsystem 76
- Scan Conversion Subsystem 78
- Raster Subsystem 80
- Elisplay Subsystem 82

The Geometry Subsystem 76 converts the 32-bit or 64-bit graphical data to screen space data. The Scan Conversion Subsystem 78 then breaks down points, lines and polygons into pixel data which are then fed to the Raster Subsystem 80, where the Z-buffer removes the hidden surfaces. The Raster Subsystem 80 also performs various blending functions on a pixel-by-pixel basis as the pixels are written to the image bit-planes, or frame buffer. The Display Subsystem 82 then displays the contents of the frame buffer on the color monitor.

1. Geometry Subsystem

The Geometry Subsystem 76 is connected to the CPU subsystem by the 64-bit MPlink Bus 84. This subsystem performs the specified transformations and lighting computations on the world coordinate geometric data before sending the screen-space data to the Scan Conversion Subsystem 78. The graphics processing in the Geometry Subsystem 76 is performed in the Geometry Pipeline™, a serial configuration of proprietary processors capable of delivering 100 million floating point operations per second (MFLOPS) of graphics processing power.

2. Geometry Pipeline

The Geometry Pipeline™ processes a stream of high level graphics commands with five Geometry Engines (GEs) 86, 88, 90, 92 and 94, each of which is a proprietary processor capable of 20 million floating point operations per second (MFLOPS). Every Geometry Engine in the pipeline includes local memory for loadable microcode and data.

The first Geometry Engine 86 uses
- a 4×4 coordinate matrix stack to rotate, translate and scale two dimensional and three dimensional homogeneous coordinates,
- a 3×3 normal matrix stack to transform surface normals The second Geometry Engine 88 performs lighting calculations. It supports up to eight point-source lights; material specifications including ambient, diffuse and specular reflectance; and lighting model information. The result of the lighting calculation is either a quad set of four 8-bit red, green, blue and alpha values (in RGB mode) or a single 12-bit color index (in color index mode).

The third Geometry Engine 90 clips coordinates to a 6-plane bounding box. A fast accept/reject clip-checking algorithm eliminates the need for complex clipping calculations in most cases. When complex clipping is required, the affected vertices are forwarded to the fourth Geometry Engine 92, which performs the actual clipping calculation. The fourth Geometry Engine 92 also performs perspective division.

The fifth Geometry Engine 94 calculates depth-cued color values and clips color components to a maximum value before converting all coordinates to screen space integers.

3. Scan Conversion Subsystem

Screen coordinates sent from the Geometry Pipeline™ to the Scan Conversion Subsystem 78 specify the vertices of points, lines and polygons. The Scan Conversion Subsystem performs the calculations required to reduce vertex data to individual pixels. Each pixel is assigned an X,Y and Z coordinate and an R, G, B and Alpha value. Color data are always linearly interpolated between vertices and between the edges of polygons.

The task of scan-converting polygons in three stages, each performed by one of three specialized processors:
- Polygon Processor 96
- Edge Processor 98
- Span Processors 100

The Polygon Processor 96 sorts the incoming vertices of polygons from left to right. The stored vertices are then decomposed into the vertices of trapezoids before being used to calculate slopes and Z, R, G, B and alpha values.

The Edge Processor 98 uses the vertex and slope information to compute X, Y, and Z coordinates and color values for each pixel that lies between the two vertices. The results of these calculations are used by the Edge Processor 98 to calculate Z coordinates and color values for every pixel along each vertical span of 1024 pixels.

The Edge Processor 98 passes span coordinates and slopes to one of five parallel span processors 100. Span Processor 0 manages spans 0, 5, 10, etc. Span Processor 1 manages spans 1, 6, 11, etc. Since spans generated from a single polygon are always adjacent, the span processing load is evenly distributed across the five processors.

4. ● Raster Subsystem

The Raster Subsystem 80 contains 20 Image Engines 102–140, each of which controls 1/20th of the pixels on the screen in a an interleaved pattern of 2-dimensional sections. A single Image Engine owns 65,536 of the screen pixels; each pixel is associated with 96 bits of data. Each pixel's 96 bits are organized as follows:
- Image bit-planes: 32 bits of R, G, B, and optional Alpha Information per buffer (2 buffers); supports either double-buffered 32-bit color (R, G, B and optional Alpha) or double-buffered 12-bit color index modes of operation.
- Depth planes: 24 bit Z-buffer
- Overlay/Underlay planes: 4 bits
- Window planes: 4 bits An additional feature of the Raster System 80 is the fast pixel read and write rate. The pixel write rate is 16 million pixels per second in image mode. This allows the hardware to implement a real-time pan and zoom capability by reading pixels from the frame buffer, replicating them, and writing them back to the frame buffer.

5. Display Subsystem

Five Multimode Graphics Processors (MGPs) 142, 144, 146, 148 and 150 concurrently read the contents of the Image and Window Planes. These MGPs allow simultaneous display of up to 64 different windows in various color modes. This allows users to display both static and dynamic images without having to consider the underlying color representation scheme.

The GTX graphics subsystem displays multiple images simultaneously, in an overlapping window environment, in single buffered RGB, double buffered RGB, single buffered color-index and double buffered color-index color modes.

(For more information on the graphics architecture, see Silicon Graphics' "IRIS GT Graphics Architecture: A Technical Report.")

K. GRAPHICS SYSTEM SOFTWARE ARCHITECTURE

Silicon Graphics' IRIX™ graphics system software manages the graphics subsystems, as well as providing a high-speed path for delivery of graphics data to the subsystem.

1. Graphics DMA

To achieve the graphics performance possible with the GTX, it is necessary that an order of magnitude more data be delivered to the graphics system in the same amount of time. One key element in delivering this data is optimization of the graphics hardware to accept vertices as the basic drawing primitive. Taken together, a set of vertices describes a polygon that the hardware draws and fills as appropriate. Each vertex may have several pieces of information, such as location, color and normals of lighting.

Each piece of information can be delivered to the graphics subsystem through a DMA transaction, which allows overlap between moving the data and setting up the next vertex. Each transaction typically moves four 32
- -bit words of data. These four words are enough to describe the location (<x,y,z,w>) or the color (<r,g,b,a>).

This DMA transaction is initiated by the processor through a single load instruction to prime the DMA engine, followed by a store instruction to the address of the vertex in user virtual memory. This triggers the DMA transaction immediately. This allows the user total freedom in placement of graphics data in his address space. All this occurs within the Graphics Library, transparent to the user application, requiring no special coding techniques.

2. Pipe Access and Feedback Areas

The graphics pipe is mapped into the user address space, along with a separate portion of memory called the feedback area. The pipe can thus be accessed either directly (for short commands) or indirectly through graphics DMA (for high speed drawing). In addition, each process using graphics has a private communication area with the graphics mapped into its address space. This feedback area is used to return results of queries or other interaction with the graphics subsystem.

3. Graphics Context Switching

The graphics subsystem supports up to 16 contexts in parallel within the graphics subsystem. Additional contexts may be managed in a "virtual context" manner by swapping an entire graphics hardware context as needed.

As the kernel context switches among processes using the graphics hardware it informs the subsystem of each host context switch, which results in a parallel context switch within the subsystem.

Graphics processes without a current context in the subsystem have the pipe and feedback areas unmapped from their virtual address space. Thus they may continue to run and process data as long as no graphics access is made. If graphics access is attempted, a page fault occurs, the process is blocked, and the window manager informed of the event. The window manager can then schedule the process to a hardware context as desired.

4. Kernel Graphics Management

Many implementations of graphics under UNIX™ treat the graphics subsystem as just another device, and force all management to be done at user level. This approach has severe drawbacks. For instance, heavy context switching between the user level processes and the graphics manager is often seen. This approach makes consistent and integrated graphics support difficult or impossible.

The IR1X™ kernel integrates graphics management into the basic functionality of the kernel. This is not the simple "text output" mode of many primitive graphics subsystems the GTX graphics subsystem knows how to draw a simple character set on its own. Instead, a sophisticated protocol for controlling graphics operation is built into the kernel. Swapping buffers on vertical retrace, exceptions in the pipe, and other conditions result in interrupts to the host, which are then handled with high level protocols.

L. SIMULTANEOUS ANALYSIS AND GRAPHICS

By combining tightly coupled processors sharing a common memory with fast access to the graphics pipeline, it is possible to support multiple processes using the CPU and graphics subsystems simultaneously. Ownership of the graphics hardware can be allocated between competing processes on a per context switch basis. While one process is accessing the graphics pipe, others can be taking full advantage of the other CPUs and FPUs.

Take, for example, a two process application, one drawing while the other renders the next frame. The analysis is processed by the full power of up to seven CPU/FPU pairs, while another is drawing the previous frame at full speed to the graphics pipe.

M. LEVELS OF PARALLELISM

In order to provide linear throughput increases within multiple processors, it is important to exploit the hardware parallelism in the system. In the IRIX™ system, this is accomplished by providing three levels of software parallelism, a multi-threaded kernel, explicit parallelism constructs for user applications, and a data-directed parallelizing FORTRAN compiler.

1. Multi-Threaded Kernel

At the heart of all Silicon Graphics' POWER Series systems is the multi-threaded kernel, which permits multiple processes to be running simultaneously in both User and System space.

As processes become eligible to run, the first available CPU picks up that process and beings to execute it. Which CPU that process was tanning on previously is immaterial except in so far as the kernel utilizes a cache affinity scheduling algorithm to match processes to their previous CPUs to maximize cache and TLB hit rates.

All CPUs can access the graphics pipe or I/O subsystems simultaneously providing a symmetric rather than a master/slave arrangement. This makes it unnecessary to switch a process from one CPU to another when it accesses an I/O device.

The multi-threaded kernel provides high bandwidth system access. Processes enter the kernel on the CPU they are currently running on, perform the system service, and return. The individual data structures (such as process blocks, inode table, buffer, cache, etc.) are semaphored so that multiple CPUs can be executing the particular code simultaneously. Contention for operating system resources is regulated via the use of spinlocks and semaphores.

2. User Directives

The multi-threaded IRIX kernel provides a seamless way to increase throughput of a multi-user and/or multiple process environment. But it is also desirable to increase the throughput of a single process application.

This is possible using the multi-processing library "limbp" which includes support for application level spin locks, semaphores, shared memory, and dynamic allocation. It also includes a full "libc" with the most often used library routines semaphored.

Synchronization is possible between both share group process and unrelated process. This provides a quick way for existing multiprocess applications (for instance, an analysis process talking to a display process) to exploit the multiple processor-using the primitives in the "libmp," a shared region can be created between them. If any synchronization is required (over and above a simple producer-consumer queue) spinlocks and semaphores are available. For simple synchronization, shared memory may also be used.

With the new arenamalloc() library call, dynamic space may be allocated inside this shared space. Thus existing communication mechanisms such as pipes, sockets, or files can be replaced with a high bandwidth memory messaging scheme.

If the application is a single large process, then the explicit multi-threading afforded via share groups can be used. If a process executes an sproc(2) system call then a share group is formed. Any number of processes/share group members may be created, and each will run on a separate processor (up to the number of processors).

A share group, by virtue of a common address space and file descriptors, can execute parts of an application in parallel. For instance, one part can perform data generation while the other is displaying the data. Synchronization is again performed using either memory, or the libmp spin locks and semaphores. Using libmp, share group members may also request system services, since the library routines such as malloc, perror, and printf have all been semaphored.

3. Parallelizing Compiler

The IRIX™ kernel supports a sophisticated program development environment, based on the MIPS compiler suite. Multiple language front ends convert each language to a common intermediate form which is then handled by common tools for optimization and code generation.

The MIPS optimizer provides several levels of optimization. Like other systems, local optimization and pipeline scheduling is performed easily. In addition global optimization and procedure inlining are also supported, allowing the programmer to achieve extremely high performance levels.

Layered on top of the FORTRAN front end is the POWER FORTRAN accelerator. The data flow analyzer is one of the most sophisticated analysis tools available for producing parallelized FORTRAN. Its output is parallelization directives interspersed in the original output file. These are recognized by the FORTRAN front end, which generates appropriate common intermediate code containing parallelization direction. The common code generator then produces parallelized code which takes direct advantage of operating system thread support and hardware locks.

In cases where the automatic analyzer is unable to safely parallelize a piece of code, the user can explicitly add parallelization directives to her code if she knows that the section of code is indeed safe to parallelize. The directives used are the same as the analyzer uses and thus are treated identically in the common processing steps.

A parallel processing library has support for shared address processes, semaphores, spinlocks and barriers. A fully semaphored standard C library completes the software support for the procedure level model of parallelism.

As a result of this strategy, the optimizer can be used directly to further enhance the performance of parallelized code. As technology becomes available to parallelize other languages, they can be added to the compiler suite easily, leveraging off the existing parallel programming support.

N. I/O THROUGHPUT

The hardware interface for the primary I/O——SCSI, Ethernet, and VME——provides a parallel interface to the kernel. Multiple drivers can be talking to the different I/O subsystems at the same time. Interrupts from different devices (including each device on the VME) are routed to different processors so that interrupt servicing is also distributed.

Multiple processor I/O access is combined with state-of-the-art disk controllers to provide control of up to four disks per controller, each with full track caches, overlapped seek optimization, and disk sorting. This combined with the IRIX EFS file system provides up to 2000 Kbytes/sec. per controller through the file system (using SMD disk drives). Even using only a single SCSI disc drive, file system throughput surpasses 1000 Kbytes/Sec.

Networking is supported via an integral Ethernet adapter, access to which is completely independent of access to the VME adapter. The SCSI adapter, useful for cartridge tape and lower speed disks is also independent of other I/O activity.

Devices on the VME bus that don't support page scatter-gather DMA can still be utilized as high speed controllers by using the integral hardware page maps. To further speed reads from an I/O device the hardware detects data in the caches that is going to be made 'stale' by the read request and invalidates it. This eliminates the need for the operating system to do a costly cache flush. Silicon Graphics' IRIX™ operating system is based on AT&T System V UNIX™, Release 3.1. This version of UNIX™ has a substantial set of features to easily support both the programmer and the user. In addition to these features, the following facilities have been added to further enhance the value of the preferred embodiment system.

O. PARALLEL PROGRAMMING SUPPORT

To take full advantage of a multiprocessor, a parallel programming model which is easy to use and powerful is necessary. This is accomplished through several levels of new functionality.

Process share groups provide a lightweight processing facility with all of the advantages of thread-like schemes and little of the burden. A parallelized version of the C library is available for using in a threaded process to insure that commonly used facilities like Standard I/O and malloc() are available and work as expected. Arena based memory allocation is supported.

Included in the parallel C library are locking and semaphore primitives which operate without kernel interaction. This avoids performance penalties for invoking kernel facilities. The primitives included debugging support to ease tracking down problems in complex multi-thread applications. In addition, metering is available to determine the usage and contention of semaphores and locks for fine-tuning an application.

P. REAL-TIME PROGRAMMING SUPPORT

Several features of IRIX™ provide support for high-speed interactive and control applications.

Non-degrading priorities provide a method for the programmer to precisely control the priority of his application in relation to other processes on the system. Normal problems associated with the standard UNIX™ scheduling paradigm can be avoided.

High-precision timing is supported through one millisecond accuracy of the time reporting mechanism, as well as being available through a signal-based timer facility based on Berkeley itimers.

Fine-grained memory locking allows the programmer to insure that critical code or data is always memory resident.

Mapped files and devices provide the programmer access to files or physical devices as if they were part of the process address space. Complex file manipulation is simplified, and devices can be accessed and managed directly from user level.

Q. BERKELEY FEATURES

Many features of BSD 4.3 are supported in IRIX™. Job control, 4.3 networking facilities, and many Berkeley commands are supported. For the programmer, BSD 4.3 system calls are supported where they do not conflict with System V semantics.

R. LANGUAGE SUPPORT

IRIX™ supports C, FORTRAN 77 with VMS extensions, Pascal, ADA, and PL/1. This support is integrated with the multi-process graphics debugger Edge, which is based on a multi-process version of dbx. This debugger also allows attaching to an arbitrary running process, which is convenient for debugging demons. Many processes may be debugged in a single session, even though they are unrelated.

Returning now to a description of the present invention, and in particular to the data storage and retrieval module of the present invention, the data stored in this module includes image files, aural characteristic files and tactile data files for all natural objects. The module is loaded with image, aural and tactile data for unique items which are specially designed and which are intended to be used in a specific application. For example, a prototype to be modeled by the system user would be considered a unique item in this context. Its unique characteristics would be specially input to the data storage module to permit user investigation of the prototype under the selected environmental conditions. A three dimensional laser scanner which digitizes its output is the most efficient means for data input concerning unique items. Presently, we contemplate a three dimensional scanner and reader which can be aimed at small to forty foot size objects for a vectored three dimensional input of the object's face, or entire surface as the device is moved around the object. It is portable, mounted in a van or other vehicle.

Another category of stored data utilized in the generation of synthesized environments is primitive image basic models. This data file contains basic polygon, fractal and ray trace information which is involved in the computational handling of the stored, generated and processed images. A subcategory of this file would be subprimitive image basics which include pre-processed image data, e.g., precomputed color and texture data for naturally occurring objects.

Another data category which is used in the processing/computational aspects of generating synthetic environmental modeling output are physics, natural laws and physical properties. The best interfacing model for the physics of light as applied to computer imaging is the Pixar RenderMan interface available from Pixar, San Rafael, Calif. This software package offers primitives for a variety of light sources and conditions that can be easily adapted to graphics programming conventions where speed and object code size are major constraints.

Similar physical behavior/graphics interfaces are used to handle motion and sound. Starting and stopping motion, in-betweening and object deformation upon impact are computed based upon pre-selected parameters once an animation pipeline is established. In the sound dimension, the importance of the physical law and property information would be best understood by the classic example: an automobile horn sound heard from a second automobile moving in the opposite direction. The cumulative impacts of ambient noise, atmosphere, pressure and the Doppler effect on the sound image would have to be defined to create an accurate image in a synthesized output.

Because the system involves radiation from the entire electromagnetic spectrum, and offers the capability of experimentation with the physics of relativity, customized interfaces for these applications would be needed, as would interfaces to non-Euclidean geometries. These interfaces involve a long-term synthesis of scientific expertise and efficient programming conventions.

A possible alternative to calling pre-defined procedures is to integrate a list-based approach from artificial intelligence into the "C" environment as in AutoLisp to AutoCAD or Borland Prolog into Turbo C.

A modem to publicly accessible science databases permits programmers to draw current physics data for the environment they are creating, during the development session, prior to actual interactive environmental modeling. Reference data for all available computerized physics data is stored in the digital library for call up from a visual menu as the programmer requires data in the computation of specific and general environmental conditions. Wavefront Software (Santa Barbara, Calif.) provides a significant visual physics package useful in this application.

In order to effectively utilize all of this stored data, the data storage and retrieval module of the present invention utilizes data compression software. Raster image data is compressed using hardware with less loss of speed than with software. However, there is a trade off between unrealistic storage demands and compression/decompression times. Software designed for document scanning, and adaptable to the present invention, is available from Optigraphics Corporation, San Diego, Calif.

Fractal raster images may be stored as iterated function system (IFS) codes that achieve compression ratios of 10,000 to 1 or higher as shown by Barnsley and Sloane, Byte January, 1988. An IFS-image synthesizer is needed to accomplish rapid encoding and decoding. Iterated Function Systems, Inc., Atlanta, Ga. provides such a synthesizer. Vector databases, because of their richer primitives and smaller size can most efficiently be handled in software routines such as are found in PKARC, a public domain program similar to the archive compression command and process in MS-DOS, with compression ratios between 2 to 1 and 10 to 1.

These compression methods may be tolerable for mass storage only. Sufficient main memory or virtual main memory may be required to achieve adequate system response to handle entire databases during a system user session.

The data file management system is another important feature of the storage and retrieval module system architecture. A mass memory filing system based on Unix hierarchial conventions and common library classification systems is the simplest and easiest way to begin data file organization. Broad classifications of data subject matter are maintained by emulating the Dewey decimal system, either manually or by machine. Icon tools on workstation platforms are invaluable in providing user interface that saves substantial data input effort. More importantly, this configuration places the full point-and-click functionality of the entire system in the hands of the system user with a synthetic workstation operated primarily by means of the vision system and tactile modules discussed below.

HyperCard on the Mac is an excellent basic alternative for data file management because it interactively handles many different kinds of data with links to other material all along the way during a session. It utilizes hardware and software integration which might require substantial programming effort, but might also result in a satisfactory tradeoff because of lowered platform costs and because of a potential increase acceptance of this technology by non-programmer developers, particularly in education. Assuming support of high-quality imaging and sound by means of add-in boards on the Mac or high-speed connections to peripherals, the generality of the microcomputer systems represents the clearest opportunity for second sourcing of fundamental subject matter in the target system. Another possibility along these lines is the hypertext model from Project Xanadu, San Antonio, Tex.. Its founder, Theodor H. Nelson described in Byte, January 1988, a system of text, graphics or other functions, and maintaining the links of original authorship and subsequent variations.

A fundamental principle behind reasonable data file management is that the known elements needed for a particular system user session are laid out in primary system memory prior to a user session. The result is that the system is not required to access the entire system data file library to locate and to process the data necessary for the user session.

Several other subsystems are included in the data retrieval and storage module. A stereoscopy dualizing computer is part of environmental modeling module output as described below. It activates the dual image overlay operation on all visual image data prior to its contact with the single imagepump or super-CRT. This component detects the vectors of a three dimensional object, and then generates two dimensional outputs from slightly different views. This component is stored and processed in the high performance workstation as described above. Stereographics (San Rafael, Calif.) and Tektronix provide sequential opto-mechanical shutter devices for use with monitors to obtain three dimensional images from offset signals.

An automatic back up data storage system for the data storage and retrieval module of the present invention is provided to avoid inadvertent loss of data. In the preferred embodiment, we use optical disks to back up the data on a regular five minute interval basis. Electronic bubble memory is acceptable for this automatic back up application.

Another important sub-system component of the data storage and retrieval module of the present invention is a positioning and movement standardized data software which receives ACSII data and convened position and movement scan vector data. The purpose of this sub-system is to convert all user position and movement scan data (as described below in USER SENSOR MODULE) into a single file format. Presently, we translate all relevant data to vector codes in ASCII in our own file format called VECT.XFR. The program looks for vector data and writes them in consecutive spaces in the file with identification codes for each group.

Each sensor has an existing address, known by the system, and known relative to its adjacency to the next sensor address. When all of the sensors are moved around in the sensing environment, their position vectors are seen to move by the computer and on an image check monitor. The adjacency addressing of the sensors helps to confirm the overall position data because the software and system know the human shape ("Model" in FIG. 6) is capable of doing and can double check its assumptions relative to default guidelines.

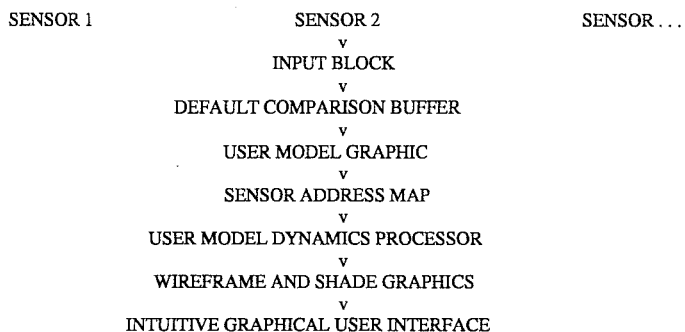

Another subsystem which forms part of the data storage and retrieval module of the present invention is image pre-design data processing array. This involves writing information into the system for a pre-selected environment, part of the pre-session development work. This feature uses the system's existing libraries to pull up the required data and to store it in an immediately accessible mode. All of the user session elements can be pre-designed, as in an architectural walkthrough. It is possible, however, to begin a user session without a set up, as in a "paint your own universe" application.

The images are pre-designed using graphics primitives from Wavefront's ADVANCED VISUALIZER™, or using our own three dimensional vector shaded image software. Vector points and scanned in data are continuously detailed out by this component to a photo realistic image, or a compressed, archived image for library storage. The pre-designed images can be stored on hard drives, WORM drives and tape cartridges. Pre-designed images that are being set-in to first stage use-ready mode are placed on the system hard drives. The workstation storage systems previously described, and magnetic bubble memories would be the desired storage modes. The data is stored off the workstation in our own file format, and translated back into the workstation format as required. In the preferred embodiment, we use three dimensional image modeling and animation structure software, ADVANCE VISUALIZER™, which is available from Wavefront (Santa Barbara, Calif.). Since the image files are processed in accordance with the cascade programming software, image files are able to cue other system occurrences. The data storage and retrieval module of the present invention includes an interactive through-put image and sound processor. This processor is designed to place the user's body parts into the generated images when viewed by the user through the visual input device. In other words, the user will be able to see her hand in the visual output if her hand belongs in the generated image. This software is event driven with a graphic user interface. It uses human form vector models which have been "tailored" to the user. Wavefront Software provides graphics primitives for this application. We have developed our own three dimensional vector shaded image software. This user-mirror body is imaged by the vector and shading o system to appear in perspective, relative to all viewed environment vectors. Hidden line removal is supplied by the software to make background image elements drop out of view in the same space that the user-mirror body, or pans, occupy. The user position and movement sensors described below provides data which commands this component to move the mirror-body in the same manner that the user body moves. The software vector checks everything in the image to make sure that one element stops when it bumps into something unless that element or elements have been set to transparent. This component also looks at the cascade program data sequence and operates sound sequences that are appropriate to the environment at any given time relative to the master user-mirror vectors and primary cascade data.

Figure 6:
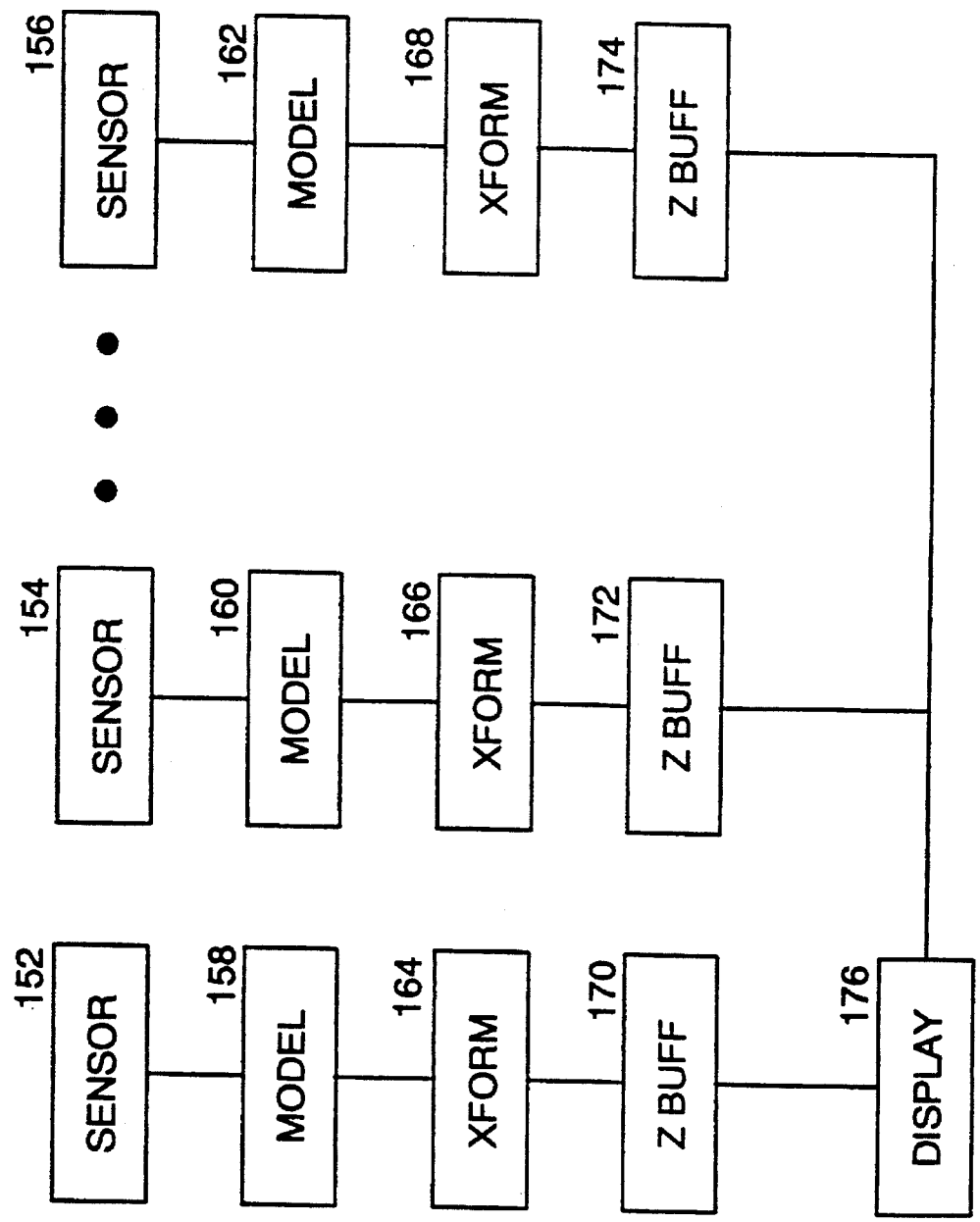
FIG. 6 is a block diagram of an interactive through-put image and sound processor according to the present invention.

FIG. 6 shows a block diagram of the interactive through-put image and sound processor. Sensors 152, 154 and 156 (more fully described below in USER SENSOR MODULE) are used to obtain information about the user's body position and movement within a three dimensional matrix. This data is then used to create the user-mirror body by vector and shading systems, model blocks 158, 160 and 162, and to ensure that the modeled user-mirror body moves in the same manner that the sensed user body moves. This result is then transformed (Blocks 164, 166 and 168) to data which can be used to generate the appropriate visual images (as well as the cascade-related sound and tactile images) during the user session. This transformed data are stored in Z-buffers 170, 172 and 174 where it will be combined with the other synthesized environment elements for display to the system user 176.

Figure 7:
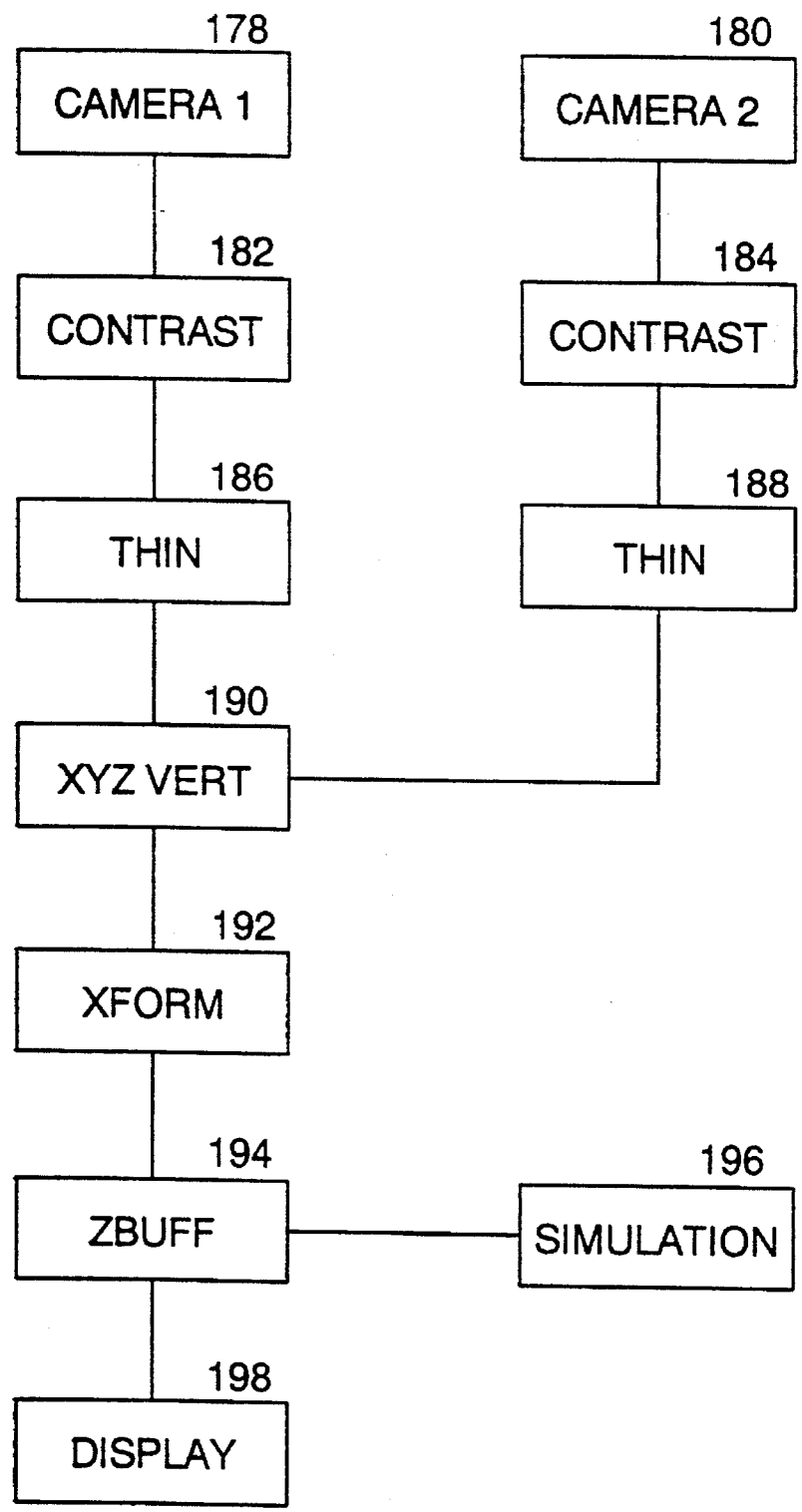
FIG. 7 is a block diagram of an interactive through-put image and sound processor utilizing video camera data collection techniques.

FIG. 7 is a block diagram of a slightly different embodiment. The difference is that the video cameras 178 and 180 are used to determine user position and movement data. (This is more fully described below in USER SENSOR MODULE.) Position and movement data are obtained by using high contrast video images to remove ambient data (Blocks 182 and 184). The video image data is thinned (Blocks 186 and 188)to leave only information about the position and movement of the user data points. The data is the vectored in block 190, transformed in block 192, stored in Z-buffer 194. It is then combined with the other synthesized environment elements 196 and the user-mirror body forms part of the display 198.

The "model" feature relates to predicting human body part movements and images based upon stored and archived male and female body parts, of all shapes and ages. When a particular user first employs the system, that user is "fitted" for a mirror-body and that information can be stored and used during the user's system interactive session. The mirror-body is brought up, as are the other primal visual to elements, from a wireframe to a shaded to a high density image with appropriate foreground and background image removal when the user mirror-body elements are dropped into the vision field. The user mirror-body file also carries attribute notations which make it cast shadows reflect light and other predictable environment interactions.

Finally, in order to protect the data storage and retrieval module, power conditioners, surge protection and power back up are provided to prevent damage to the module.

II. USER SENSOR MODULE

The next module of the system of the present invention is the user sensor module which is designed to detect user position and movement data and transmit that information to the environmental modeling module. This data is used in the generation and processing of synthetic and absolute environments according to the present invention. Rapid determination, transmission and processing of user position and movement data enhances the reality of the user's experience in interacting with the present system.

The complexity level of the sensor module is directly related to the expected applications of the system. For example, it is possible to use the system on its simplest level, utilizing information concerning only the position, movement, flexion and extension of the user's hand. On the other end of the application spectrum is full body position, movement and health telemetry sensing which requires a more sophisticated sensor system.

In one umbilical-less embodiment of the user sensor module, a specially created full body suit, including gloves, boots and headpieces, is employed to monitor user position and movement in a three dimensional chamber having walls, ceiling and floor. This fully body suit is equipped with a plurality of six-axis positioners to transmit via radio frequencies user position data to receivers which are within the walls ceiling and floor of the three dimensional chamber in which the user interacts with the system. Commercially available Polhemus six-axis position sensors (McDonnell-Douglas) are adequate for this application. In addition to the six axis positioner sensor devices, electromagnetic and sonic proximity sensors are incorporated into the suit in order to monitor user body part movement relative to other body parts. These proximity sensors are miniature feedback sensors which fits into the palm of the suit-glove. Miniature output studs are mounted on each hand point.

These umbilical-less proximity sensors preferably use sonic or infrared waves. Photon beams can only be used in scanning mode. All of these sources are able to monitor all body movements where change in proximity from one part of the body to another is measurable. The feedback loop is from sender to sensor and from sender to receiver block on the perimeter of the chamber via infrared beams and FM radio signals. In another embodiment, sensors pick up energy pulses (light or sound) from the sensor. The frequency of pulses increases as sensor and sender get closer together.

It is important to note at this point that the added complexity of multiple system users impacts upon the proximity sensor design, as well as user position detection because the sensors will be unable to easily distinguish among different data points or different users. In this case, some or all of the user's will have to use umbilical systems to keep the user position and movement data separate.

In this first embodiment, the suit headpiece contains a pitch, roll and yaw positioner feedback device mounted to the front center of the head piece for the visual input device. Pitch, roll and yaw devices can also be mounted on other suit locations, depending upon the need for this additional information.

In the present embodiment, Polhemus devices are used on the headpiece to measure pitch, roll and yaw of the user's head. We find these devices to be physically too large for anything other than developer work because data transmission is too slow, and the resolution is not high enough. In our preferred embodiment, a cableless, lightweight device is provided to transmit six-axis relative vector information in ASCII-type code at a minimum of one hundred positions per second. The initial transmission to the receiver unit in the chamber wall is via infrared beam.

According to a preferred embodiment, the suit can be used with specially designed boots for the user's feet containing frequency generating devices which transmit position and movement data to receivers in the three dimensional chamber floor which has been set up in an antenna grid.

In a second embodiment of the user position and movement sensor modules, the user dons colored body wear upon which has been disposed sensor points which will interact with the electromagnetic radiation sources and receivers disposed in the chamber's walls, ceilings and floor. This suit is considerably less cumbersome and intrusive than the suit used in the previous embodiment. Remote scanners in the infrared and ultraviolet frequencies will pick track the suit's data points. This collection technique is effective both in measuring the user's gross movements, and in measuring the movement of limbs and the fingers relative to the user's body as a whole. The suit data points are reflectors, light sources and sound sources. Laser range finding devices are also employed. Antennae grids in the chamber's walls, floor and ceiling provide overlapping coordinate data of the user's actual full dimensional space within the chamber. Moire interferometry and sonic impulses are also used to collect position and movement data.

In this second embodiment of the user sensor module, position and movement data is gathered in at least two separate modes (separate electromagnetic radiation signals), and then the two modes are co-matrix averaged to provide a single file of position and movement data to the environment modeling module. Technology exists to practice this aspect of the present invention. Fiberoptically wired suits are used to generate multiple light points which can then be detected. Transformation matrices (identified as 164, 166 and 168 in FIG. 6 and 192 in FIG. 7) are 4×4, although 7×7 might also be used here.

According to a third embodiment of this invention, CCD color, black and white and infrared video cameras are used to detect user position and movement. It is preferable to use a plurality of cameras at different electromagnetic radiation frequencies to scan light or color points on the user's suit. The basis for the raster transformation of this position and movement data is found in "Projection Transform Points in a Coordinate System n into a Coordinate System of Dimension n," Pavlidis, Theo, *Algorithms for Graphics and Image Processing*, Computer Science Press, 1982. In two dimensional raster scanning, the sampling is usually done 1:1 per pixel. In three dimensional space, voxels would be scaled as follows: assuming a world coordinate system which maps into screen coordinates of the video (CCD color, black and white or infrared) output device you can use the overall value prevailing at the user's position in the scene divided by the raster to determine sample size. This raster/vector synthesis method would have the advantage of being least invasive to the user. A schematic of how this process can be integrated into the overall system is shown in FIG. 8.

An aspect of this raster transformation process is to use high contrast imaging followed by image processing to thin the video data. See blocks 182. 184, 186 and 188 in FIG. 7. This thinning process helps to remove, the unimportant ambient information, leaving only the useful sensor points.

Figure 8:
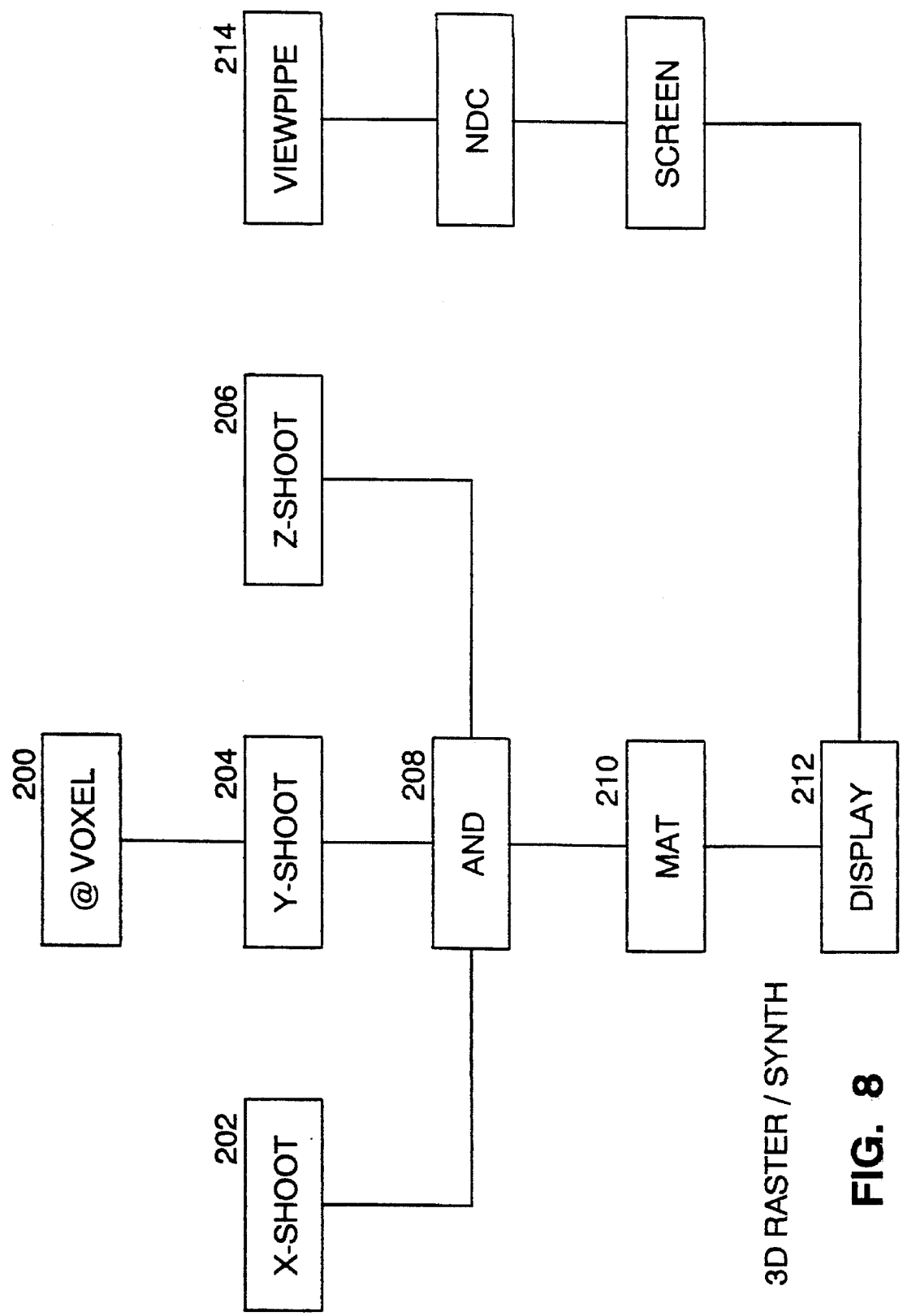
FIG. 8 is a block diagram of a raster-based sensor method could be used to determine user position and movement data which can be integrated with the environmental modeling module of the present invention.

Referring to FIG. 8, user information (from block 200) is combined with single axis position and movement data from X-shoot 202, Y-shoot 204 and Z-shoot 206. This information is combined, thinned and processed in AND block 208. This data is then formatted in Mat 210 for use in the display mode 212. Viewpipe 214 provides the remainder of the environment elements which are combined with the user-mirror body (see above) for the generation and processing of a single output mode.

User health information is typically obtained for monitoring the system user's response to the generated environment, although it is possible to use this information for a scientific study of a response. The information is maintained for liability purposes, and would normally only be set to alarm during a user biological overreaction. The user health information is not normally transmitted to the environmental modeling module, thus it does not usually end up in the computational processing of the generated environment. Health information is sensed via body pick-ups which is transmitted via infrared frequencies to receivers in the chamber walls.

All of these embodiments of the user sensor module are nonintrusive and do not require cumbersome umbilical cords.

A component of the user sensor module is the three dimensional chamber itself. See 14 in FIG. 1. From the sensor perspective, this chamber is filled with coherent and incoherent biologically-safe electromagnetic spectrum scan grids operating at many frequencies. The chamber physically consists of a square metallic framework which is modular and can be configured and reconfigured to adapt it to varying applications. The modules can range in size from 6 feet to 20 feet square. The modules can be provided in multiples for installation in auditorium or gymnasium sized rooms.

Another use of the present invention involves the use of remote probes to gather data about an absolute (existing) environment, which might be too dangerous, too small or too remote for humans. For example, remote microsurgical probes could be used to gather information about a patient's physiology. Remote probes could also be used to explore physical areas which are too dangerous for actual human contact, e.g., undersea or in nuclear power plants. Information about these remote absolute environments is then radio transmitted back to the remainder of the system apparatus. The user in a generated version of the absolute environment can then manipulate a simulated probe which could then activate remote robotics.

The remote probes are controlled by the user's position and movements within the chamber. If the user turns her head in the chamber, the probe will turn the same way. The photorealistic accuracy of the generated synthetic and absolute environments provides the user with three dimensional visual and aural output to make the user feel like the probe itself. The remote probes communicate with the chamber and system primary control module via geosynchronous satellite transponders, fiberoptic telecommunications lines, microwave beams and other systems in a network from user to probe to link all signals, real time, to input and output from both user to probe or probes.

III. ENVIRONMENTAL MODELING MODULE

The system environmental modeling module uses as its input: pre-selected image files, sound files, tactile data files and data concerning the applicable natural laws of physics and nature, to provide real time generation of synthetic and absolute environments, objects and interactive user-viewed user body pans. The data storage and retrieval module described above contains high powered workstations and painting, modeling and sculpting software which can render photorealistic visual imagery and other user stimuli. Since it is an inherent feature of the environmental modeling module to be pan of, and to be stored in the data storage and retrieval module, most of the environmental modeling module has already been described above. See particularly stereoscopy dualizing computers, primitive image basic model files, positioning and movement standardized data software, image pre-design data processing array and interactive through-put image and sound processor.

One aspect of the environmental modeling module is not provided by the. Silicon Graphics' POWER Series workstations is a tactile sensory output. We have written software in which the tactile information is cascade programmed from a visual element in the viewed synthetic environment. A vector surface graph of the visual element is chosen by the user. The vectors of this surface are translated into pixel addressed points in the shapewall hardware to set the tactile surface parameters required. The environment is modeled, based on the pre-user session creation of a three-dimensional computer animation file of all required elements for the user session. The user sensor module determines the appropriate speeds and pressures for the variable treadmill, and for the air velocities based upon user movement and positions. Bladders in the user's boots, operated and controlled by FM radio frequency signals effect the foot tactile mode.

With respect to absolute environments, the real time mode is processed via cascade programming which combines images, sound, smell, tactile actions, input and output into a cohesive common machine language and file adaption system.

IV. USER STIMULI MODULE

The output of the environmental modeling module is structured to be input into the user's biological senses. This means eyes, ears, smell and touch. Each of these senses requires a different sensory interface with the environmental modeling module output.

Beginning with the visual sense, there are several embodiments of the present invention for input of the model output to the user's eyes. All of these embodiments take off from the same general output mode of the environmental modeling module: particularly, a fully dimensional raster-vectorized mode in which a single compute server generates stereoscopic information by optically offsetting the images.

Figure 9:
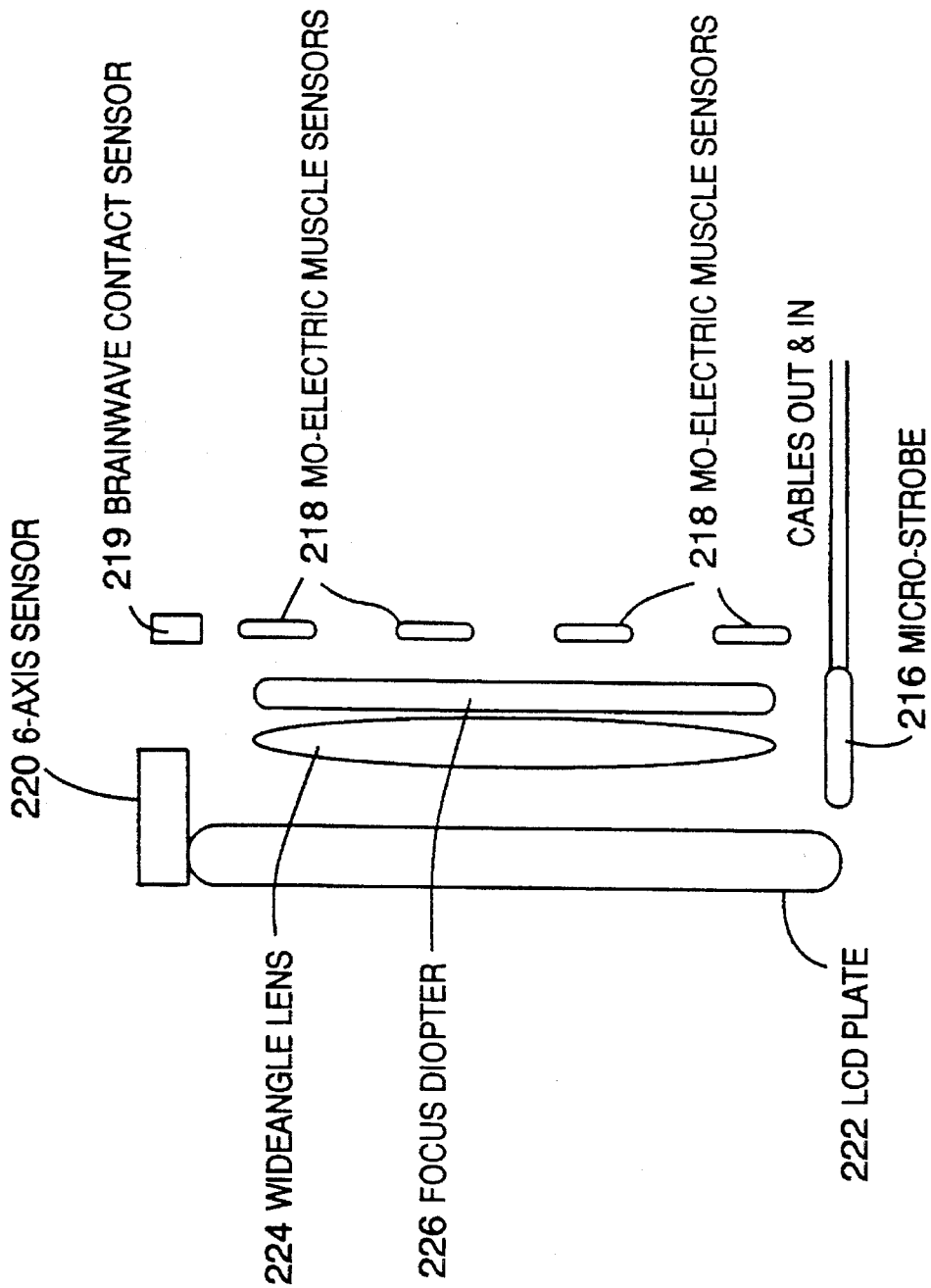
FIG. 9 is a side elevation view of the first embodiment of the visual input device.
Figure 10:
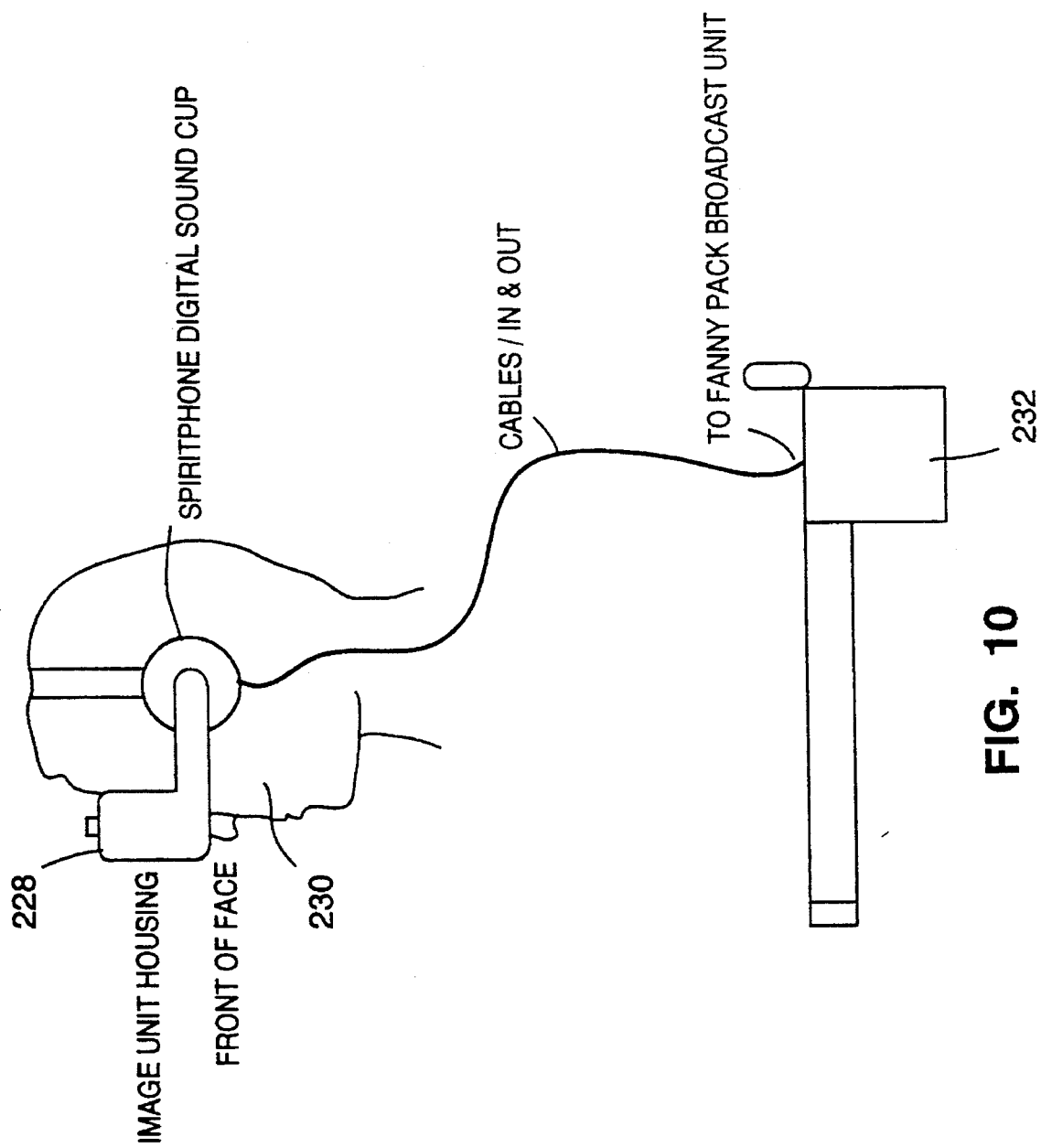
FIG. 10 is a schematic view of the first embodiment of the visual input device.

From this modeling module output, the first embodiment of the visual input device of the present invention uses bio-synchronized peripheral micro-strobes and dual vision LCD color eye monitors. A diagram of this device is shown in FIGS. 9 and 10. In this figure, micro-strobes 216 are biosynchronized by pre-set cycles which are cascade activated by the various image element in the visual output mode of the environmental modeling module. The microstrobes 216 are controlled by eyepiece biological feedback muscle sensors 218 and brainwave sensor 219 which gather information on the user's alpha and other brain waves. User head 230 pitch, roll and yaw is monitored by sensor 220. These sensors all effect the geometrically equal and faster offset rates of the micro-strobes. The strobes are triggered at high speeds asynchronously in a manner that disrupts brain vision signals and causes internal vision imaging to be generated in the visual cortex. The microstrobes 216 are positioned in the lower comers of visual input device 228, one per side, to illuminate the screen 222. The microstrobes are high frequency sub-miniature strobes with long life.

In this embodiment, the stereovisual images are offset in the single output mode according to programming language entered into the environmental modeling module. The program directs the computer to generate the final visual image as two images, taking into o account human parallax and other human visual traits, the two images being approximately offset from each other. The images are optically differentiated in one of two ways: either by receipt aboard multiple image guides to each eye, or by multiple image projectors at each eye.

LCD Plates 222 are available from Sony (Model FDL-3305) and Toshiba (Model TFD 40W01), and are modified to adapt to the headpiece. Wide angle lens 224 and focus diopler 226 are provided to correctly focus the image for the user. The device is connected to a belt-worn broadcast unit 232.

Figure 11:
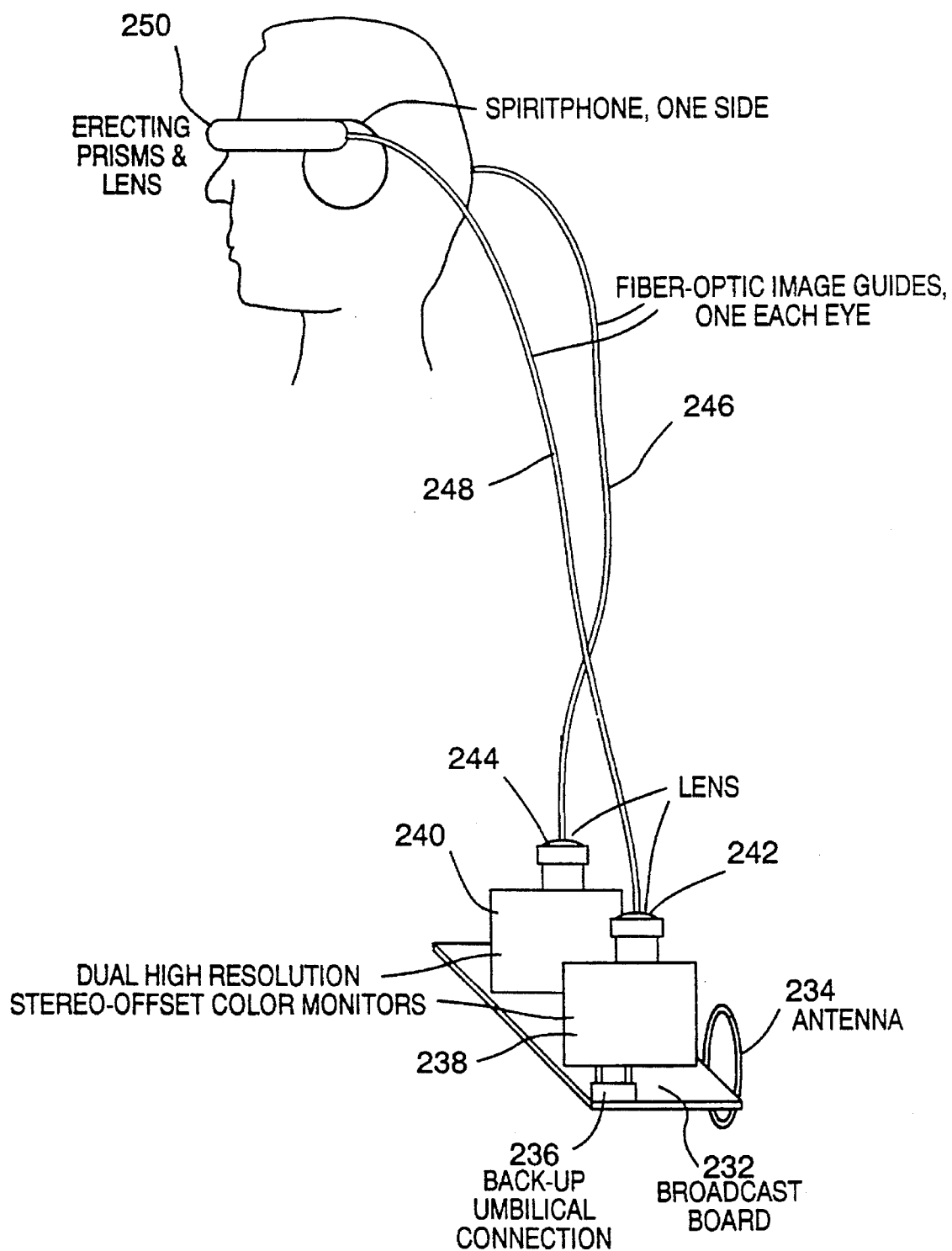
FIG. 11 is a schematic view of the second embodiment of the visual input device.

The second embodiment of the visual input device is shown in FIG. 11 where a broadcast board 232 receives data either through antenna 234 or back-up umbilical cord connection 236 to power and feed two high .definition monitors 238 and 240 to create two separate images which are then transmitted to the user's eyes through lenses 242 and 244 and fiberoptic stacks 246 and 248, terminating in headpiece 250.

The high definition monitor screens 238 and 240 can range from two to twenty inch diagonally. In either case, the monitors would have a nominal resolution of 1280 dots by 1024 lines minimum. When selecting from the two inch through twenty inch diagonal monitors one of the primary considerations is monitor weight. Two to four inch o diagonal monitors may be user-mounted on a specially adapted belt. Larger monitors are too heavy for the user to wear, and provisions must be made for access of the generated images from remote locations. User mounted units use broadcast power or batteries to power the monitors. The remote units use standard AC power, and have wired image reception. User mounted units employ low-power broadcast reception.

As shown in FIG. 11, images are input from the monitors 238 and 240 to the fiberoptic stack 246 and 248 through optical lenses 242 and 244 at one end of the fiber bundle. In certain embodiments, a o shutter can be installed at the end in each image guide, allowing stereoscopic images which are compressed into overlaid scans on a single high definition television monitor to be split to each eye. A specially designed headband 250 mount holds the image-out ends of the fiberoptic stacks at the front of the user's eyes.

In one embodiment of this visual input device shown in FIG. 1, the high definition television monitors are cable mounted to steel girders which contain the chamber. As the user moves in the chamber, the entire assembly is designed to follow the user's movements.

The third embodiment of the visual input device is shown in FIG. 12. This device uses a direct retina scan to place the image directly into the user's eye via lower power laser diode imaging packs 232.

According to the present invention, retinal scan uses red 234, green 236 and blue 238 laser diodes which are scanned via electromagnetic pressure fields 242 on a target alignment focused on the interior eye element, the retina, via magnetic field focus ring 240 and lens. Retinal scan devices must meet established FDA safety requirements. This whole array is mounted in a closed eyemask unit 248 worn like a pair of goggles. The optics of the eye and custom manufactured optical units 244 work cooperatively to focus the image onto the biological visual receptors. This unit may operate with an umbilical 246 to place the image into the diodes, or may use low-power broadcast to transmit the image data to the diodes 234, 236 and 238.

Figure 13:
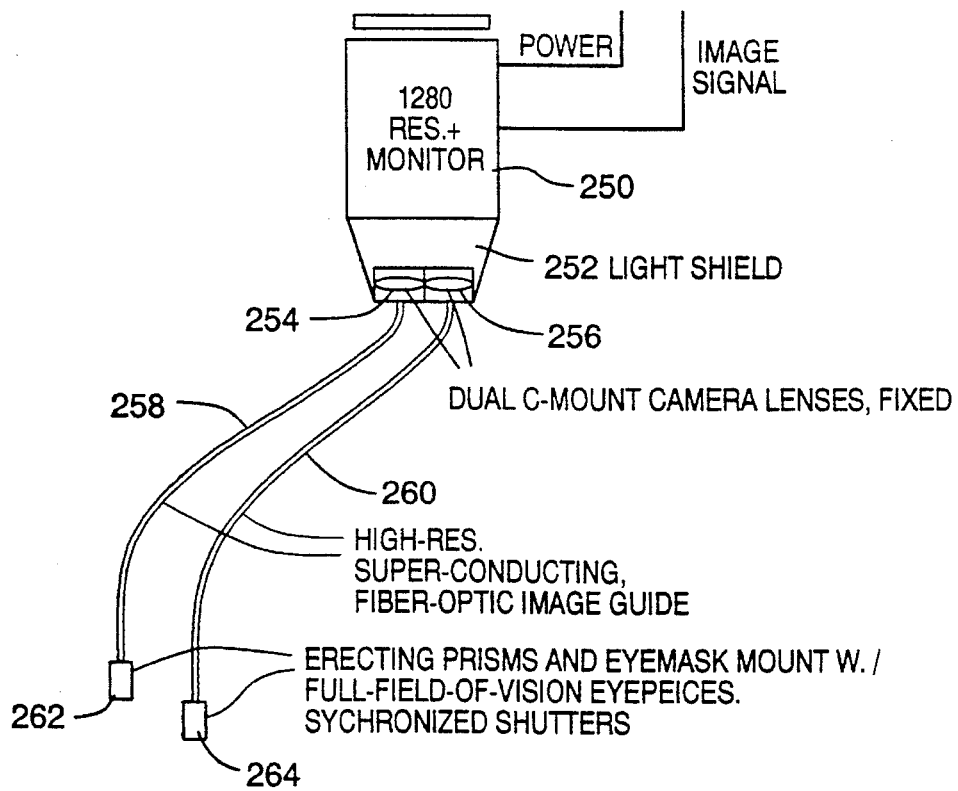
FIG. 13 is a schematic view of the fourth embodiment of the visual input device.

In the fourth embodiment of the visual input device shown in FIG. 13. The image is taken from a high definition color monitor 250, through light shield 252 and lenses 254 and 256 via fiberoptic cables 258 and 260. Erecting prisms 262 and 264 which are eyemask mounted are at the user end. Synchronized shutters, either magnetic or opto-electrical are mounted in the front of the eyepieces 262 and 264.

Figure 14:
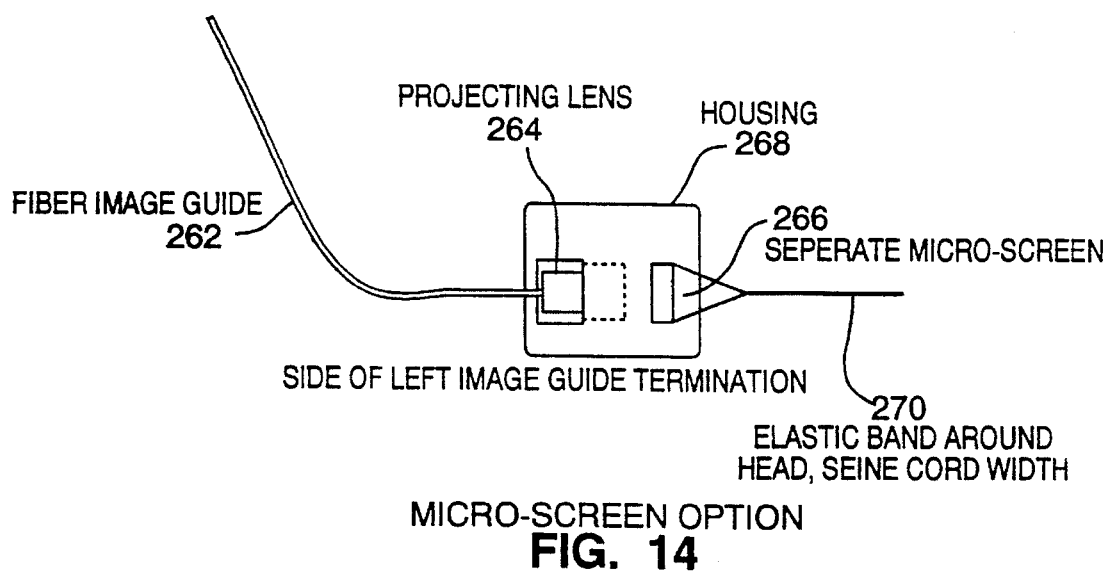
FIG. 14 is a detailed side elevation view of an optional addition to the fourth embodiment of the visual input device.

In an acid-on feature shown in FIG. 14, the visual image is carried through fiberoptic cable 262 into projecting lens 264 and projected onto microscreen 266 which is mounted in housing 268 and held one-quarter inch in front of the surface of the user's eyes by elastic headband 270. The microscreen 266 is fabricated from a translucent resin plastic material with a high transmission rate and a frosted face on the thinnest level on the surface facing the projected light. Typically, the screen's dimensions are oval shaped 2 inches by 1 ¼inches. The front face is ½inch from the rim and is an oval 1 ½inches wide and ⅞inch tall. The microscreen is mounted in the housing 288 and held to the user's head via elastic cord 270.

Figure 15:
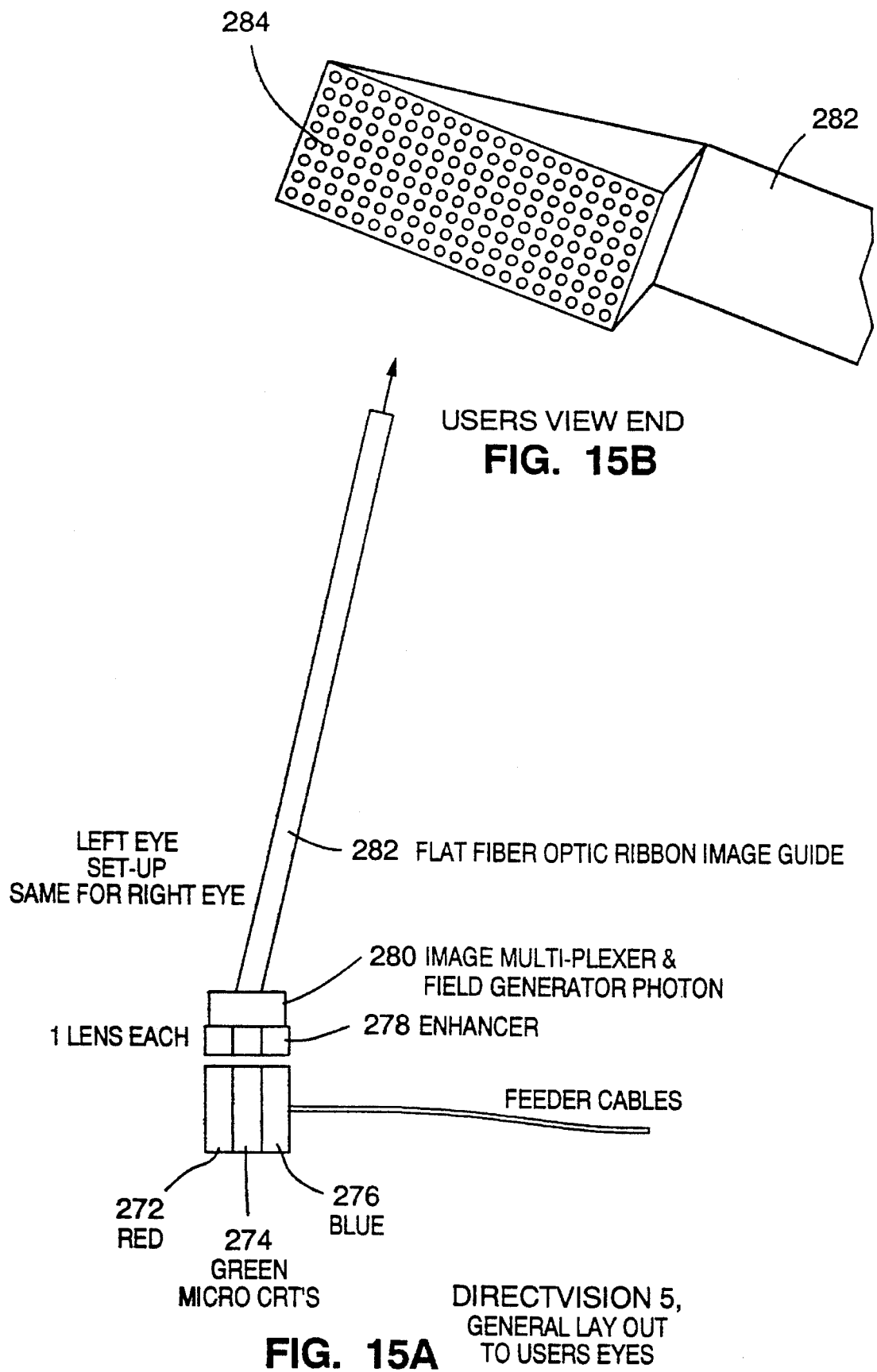
FIG. 15a is a schematic view of the fifth embodiment of the visual input device.
FIG. 15b is a detailed view of the user end of the ribbon cable.

FIG. 15 shows a fifth embodiment of the visual input device. High definition color monitors 272, 274 and 276 are mounted on the user's belt. Then, frame sequenced densepack fiberoptic image decompression via lenses, enhancer 278 and multiplexer/field generator 280 is used to project the image output to the user's eyes, as in the fourth embodiment. The fiberoptical cables 282 are bonded in a vertical line-up from left to right, and then cut and polished at an angle. This allows the bundle 282 to come to the user's eye as a flat ribbon 284, rather than as a thick tube. The image signals are frame sequenced in that each of the three primary colors has its own high resolution and high brightness remote HDTV monitor. Photo discharge 280 through the fibers is enhanced by an electromagnetic coherency field generator 280 which basically makes the image brighter. The fiberoptic cables 282 use erecting prisms to put the image on the expected horizontal plane that the user would want to see. The fiberoptic cables, at the user end, have dioptic adjustment for user focus, and electronic shutters in the case of final stereoscopy offsetting. Microscreens, as in FIG. 14, may be used as well.

The next sensory interface event takes place at the user's ears. The environmental processing module has an audio signal which provides multidimensional digital sound to accompany the generated visual imagery. As described above, the sound output is cascade programmed lo correspond to the visual imagery.

There are two embodiments of the aural input device. In the first, matrixed individual microspeakers are arranged to provide a multidimensional sound output. In this embodiment, a multi-microspeaker array is affixed to the perimeter of the chamber at floor, mid-and top levels. In the second, a headphone-like piece is created in which multiple subminiature speakers are arranged around the user's ears. The audio signal is transmitted to the headphone via stereo infrared beams which are split down to eight to fourteen mono signals. The volume and phasing of each signal is automated and cascade programmed to correspond to a particular image element. The sound output speakers are full range miniature speakers in a geometric pattern arranged to work with the human ear architecture to make each sound to appear to be coming from an apparently different geographical position. In one of our preferred embodiments, we use Sony miniature speakers.

In either embodiment, the speakers are all connected to a multi-port bus which takes switched, volume modified, phase and effect modified signals from a "MIDI" interface control, and sends them through the different ports, or simultaneously through any given port as the environment demands.

Other user sensory input is accomplished in the context of a three dimensional chamber. This chamber 14 in FIG. 1) has already been described above relative the sensor mode to accumulate user position and movement data. The chamber is adapted to be interactive with the system user's biological senses. In addition to the visual and audio input previously described, the chamber is also equipped with a tactile output system 24 which permits the user to walk right up to it, and experience the generated environment through her tactile senses.

The tactile output device 24 can be made integral with the vertical walls of the chamber, or it can be free-standing. It is composed of one foot square modular sections which attach to each other to form any size wall surface or free standing pod in the chamber. One of these modular sections contains a series of hundreds (low resolution) or thousands (in high resolution designs) of metal rods with a rounded polygonal teflon head which interconnects to each of its adjoining heads. The rods are electromechanically driven forward or backwards via pixel-type addressing as explained below. A three dimensional computer vector grid image is used to design the shape and vectors are transposed to pixel address points. The rods are driven forwards or backwards according to the shape to be generated. The rods push against interchangeable flexible skins placed between the rod heads and the user. The rods are held in position via level-by-level friction brake until released to reform. The rod brake has an assignment for degree of spring or give which makes the spring mounted rod feel more spongy or rocky as required. This is accomplished by making the brake set harder or softer. Air impulse or electro-pneumatic servos would be used to drive the metal rods. Magnetic levitation floaters can also be used.

A basic set of woven, laminated flexible skins could be stored on roll down tracks, and easily installed for each experience relative to the anticipated surfaces for that environment. Gloves can also be used in conjunction with the flexible wall skins. These gloves would have an additional layer of padding that would further sooth the effect of interaction with the rod-shaped wall. As noted above, stand alone modules can be set up in the chamber to stimulate small items. The modules can be placed on robotically driven podiums which are simple mechanoids with bump-avoidance proximity sensors and free roaming wheeled base. The robotics are assigned positions in the chamber by the cascade programming, and the robotics are able to locate their position by referencing the chamber floor antennae grid. These tactile units are also equipped with compressed air stream capability with a similar pixel addressing system to form a back pressure surface simulation with a different type of effect or feel. Rods and jet streams can be configured in the same block.

Figure 16:
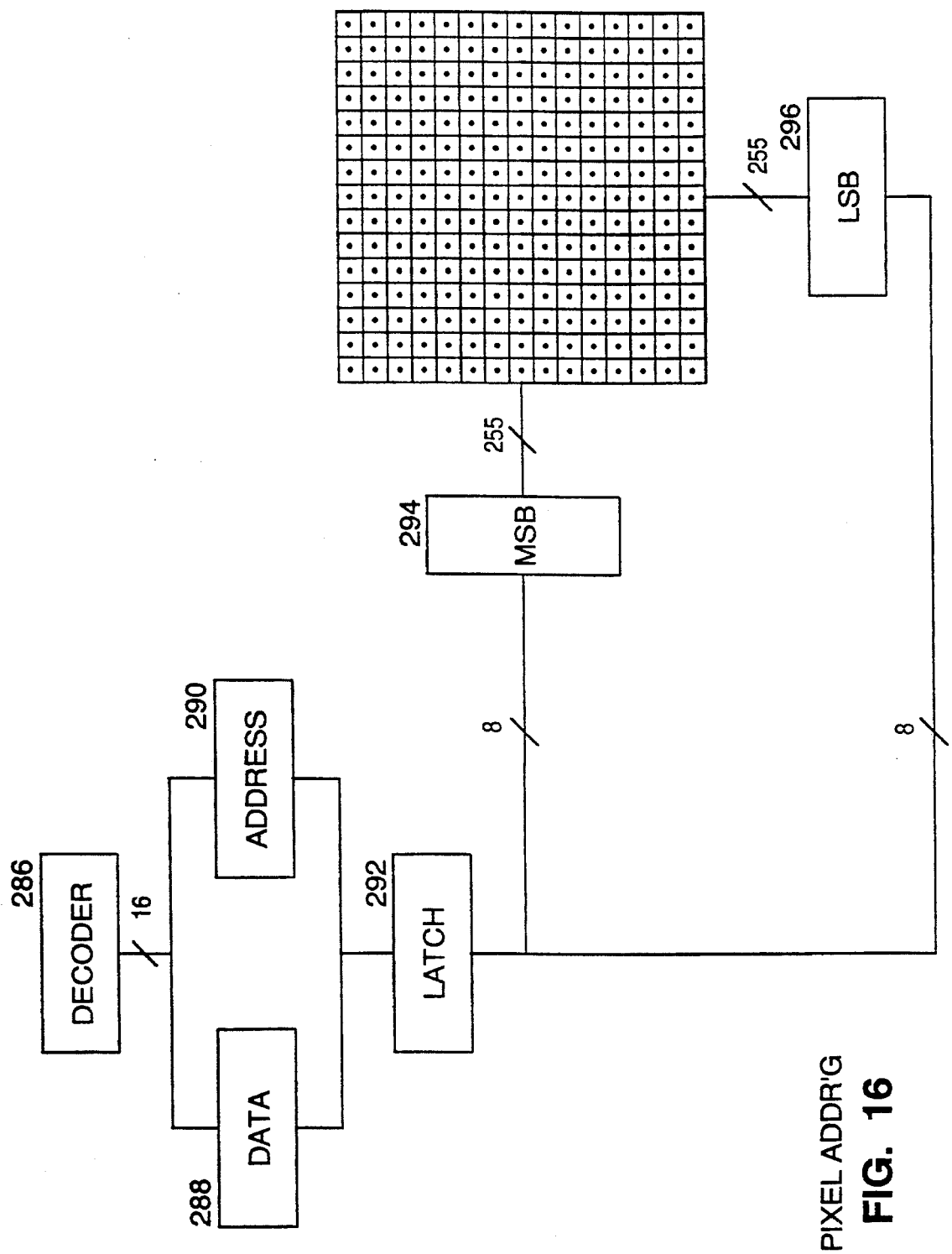
FIG. 16 is a block diagram for a pixel addressing scheme.

The pixel addressing scheme for the tactile output device is illustrated in FIG. 16. The decoder block 286 accesses the environmental model output and then enters the data and address blocks 288 and 290. Latch block 292 provides an x,y coordinate address for the pixels and the servomotors are activated by block MSB 294 and block LSB 296. In UNIX programming code, the call would be:

```
texture_pad (x, Y, pin_height, device)
Int x, y, pin_height, device
```

A two port scheme for pixel addressing is shown in the block diagram of FIG. 17. This scheme is capable of supporting a 48K module using three arrays of eight 16K×1 4116 dynamic RAM chips capable of supporting a medium resolution display with 4 bits/pixel or a high resolution display of 1 bit/pixel. The embodiment described above implemented read/write access from an application by means of bank switching, resulting in the memory location being addressed in the same way as main memory. To a programmer, the call for the two port scheme still looks like the following:

```
Texture_block (x, y, pin_height, block_device)
unsigned int x, y, pin_height, block_device
```

The program then handles the memory access details of bank switching and the video display board would handle the details of reading and displaying the memory contents three bytes at a time according to an on-board switching scheme which is not required for the texture pad. The 4116s are replaced by actuator circuitry that alters the pin height, and determines response time. This two port scheme achieves its purpose in 811 [MU] sec. cycles, half of this time devoted to host read/write, one byte at a time, and the remaining half devoted to video display memory accesses. In the case of the rod-driven tactile unit, add the following:

```
Texture_wall (x, y, pin_height)
Unsigned int x, y, pin_height
```

Here, range checking and device blocking would be preformed.

The user stimuli module contains a smell output device. Small vials containing distilled oils from odor producing organic and inorganic compounds are stored in a storage rack with a liquid vial carriage access similar to those used in automated hematology analyzers. Cascade programming connects the small output to the visual images. A heated drip pad is used to introduce the odors into the chamber upon command.

Another component of the user stimuli module is a vehicle simulator 32 in FIG. 1. It simulates high speed and long distance flight while creating a dynamic focus of, and a creating station for, user operating commands while being transported. It has functioning controls which alter the sensory perspective of user.

As previously mentioned, the user may don specifically designed boots whose inner soles contain bladders which are filled with a material which can be hardened or softened by stimulation from air pressure or electric DC current input. These boots contain receivers which can activate the inner soles via radio transmission of data.

The chamber can be equipped with enhancements such as air jet streams 34 which provide user stimulus to simulate forward and backward motion. Sonic resonators may also be installed to relax user's brain functions and increase susceptibility to the synthesized environmental modeling output. Temperature variations can be effected by regulating chamber temperature, or modifying the temperature inside the user's suit.

V. PRIMARY CONTROL MODULE

The overall system operations are controlled by the primary control module. In the high end systems, this means a control room. In single user systems, it may mean administrative automation software. As shown in the embodiment pictured in FIG. 1, the primary control module would be physically adjacent to the chamber 14. In the case of smaller, personal systems 30, it is built directly into the workstation. In larger configurations, the primary control module can be staffed with two monitoring technicians. In other configurations, the system may set the control module to full automation.

The primary control module is assigned a variety of functions. The control module is equipped with time management and scheduling software to monitor system files to allocate accounting charges to the proper account. It provides record keeping capability for memory and other system capability. The primary control module has input consoles and workstations to permit data input, pre-session imaging and other preparation, and in-session controls of the environmental modeling output, including controlling user stimuli input. The primary control module uses real time camera monitors to follow remote probe o operation. This module communicates with, reports and monitors user health telemetry data. It includes digital activity recorders for memorializing system activity parameters. The primary control module provides for audio-visual communications with all staff, users and technicians. The module maintains read out screens on all functioning system components and data-gathering gear.

The primary control module maintains control over remote probes which are typically equipped with a vision module—including dual CCD, color, high resolution, human eye aligned, automatic, housed video cameras with variable wavelength sensitivity, including pitch, roll and yaw movements matrixed to follow user's movements.

Another feature of the primary control module is user menus. There are graphical translucent images which drop into the user's field of view. As the user raises his hand toward the command grid, the menu driven command button that she is aiming for glows brighter as her finger near,,; it. This image enhancement helps to aim for the target. When activated, the button glows brightly, sound "binks" and then the command menu disappears. The command menu may also be called up via voice activation:

"COMMAND GRID". The use may call up a single menu, a series of menu, or operate from a master menu directory. The user is able to call up the functions that a keyboard in any out of chamber work station could implement. The user may be required to control all aspects of all parameters, or write an environment during an interactive session. In the case of remote probes, a user would need to use the command menus extensively to control real-time activities.

VI. IN-SYSTEM COMMUNICATIONS MODULE

This module of the system is designed to permit voice-activated commands. It is designed to cover communications from the system user to the primary control module, or technicians manning the primary control module. The user will be supplied with a microphone connected to the system via electromagnetic spectrum transmission mode. The in system communications module is designed to provide communication from remote probes, including issuing commands and receiving data.

Kurzweil voice command systems are currently available for creating an application based vocabulary which can then be employed in particular user sessions according to the present invention. Special floppy disks or other portable data storage devices are used to import user-specific voice phonetics and user voice recognition information for the user session.

While the invention has been described here with respect to a particular embodiment, it will be apparent to those of ordinary skill in the art that certain modifications may be practiced within the scope of the appended claims.

I claim:

1. A method for generating and processing synthetic and absolute real time remote environments for interaction with a user comprising the steps of:

a) storing high resolution digital image, sound and position coordinate data and retrieving the stored data, compressing data for storage in image files, said image files including data for recreating images of absolute objects, data to recreate at least one primitive image basic model and data for recreating predesigned images, recreating absolute sounds from the digital sound data, and selectively combining an image of at least a portion of said user within an environment constructed from said primitive basic model and from said recreated predesigned images;

b) non-intrusively sensing the position and movement of the user's body within a three dimensional matrix;

c) processing user body position and movement data;

d) receiving processed user body position and movement data and generating images of interactive body parts of said user in response to said data, and further generating real time absolute and synthetic environment output in response to preselected commands and parameters stored in said data storage and retrieval means;

e) inputting absolute and synthetic environment output to the user's biological senses via three dimensional visual input to the user's eyes, multi-dimensional sound input to the user's ears, and tactile input to the user's hands, feet and at least one other body part; and f) verbally communicating with the user to and from a primary control means, whereby a user's selection of a synthetic or absolute environment, or a combination thereof, is communicated to the primary control means to enable the user to interact with the selected, generated and continually processed synthetic and absolute environment output.

* * * * *